US011982817B2

(12) United States Patent
Matsui et al.

(10) Patent No.: US 11,982,817 B2
(45) Date of Patent: May 14, 2024

(54) DISPLAY SYSTEM

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/075,659

(22) Filed: Dec. 6, 2022

(65) Prior Publication Data

US 2023/0098787 A1 Mar. 30, 2023

Related U.S. Application Data

(63) Continuation of application No. PCT/JP2021/019531, filed on May 24, 2021.

(30) Foreign Application Priority Data

Jun. 8, 2020 (JP) .................................. 2020-099648

(51) Int. Cl.
G02B 27/01 (2006.01)

(52) U.S. Cl.
CPC ..... G02B 27/0179 (2013.01); G02B 27/0101 (2013.01); *G02B 2027/014* (2013.01);
(Continued)

(58) Field of Classification Search
CPC ............ G02B 27/0179; G02B 27/0101; G02B 2027/014; G02B 2027/0183;
(Continued)

(56) References Cited

U.S. PATENT DOCUMENTS 11,194,154 B2 12/2021 Suzuki et al.
2004/0100419 A1* 5/2004 Kato .................. G09G 5/00
345/7

(Continued)

FOREIGN PATENT DOCUMENTS

JP   2015-101311   6/2015
JP   2016-222061   12/2016
(Continued)

OTHER PUBLICATIONS

English-translation of the International Preliminary Report on Patentability dated Dec. 22, 2022 in International (PCT) Application No. PCT/JP2021/019531.

(Continued)

*Primary Examiner* — Brent D Castiaux
(74) *Attorney, Agent, or Firm* — Wenderoth, Lind & Ponack, L.L.P.

(57) ABSTRACT

A display system is for controlling a display of display content. The display system includes: a processor; and a memory having stored thereon instructions executable by the processor. The instructions include: performing image correction involving a change in a display position of the display content based on image correction data stored in advance; detecting an attitude change amount of a movable body; calculating, after the image correction is performed, a vibration correction amount of the display position of the display content based on the attitude change amount of the movable body and an image correction error of the image correction caused by vibration correction processing of correcting a display deviation caused by an attitude variation of the movable body; and controlling the display position of the display content based on the vibration correction amount.

20 Claims, 16 Drawing Sheets

(52) U.S. Cl.
CPC ........... *G02B 2027/0183* (2013.01); *G02B 2027/0196* (2013.01)

(58) Field of Classification Search
CPC .... G02B 2027/0196; B60K 2370/1529; B60K 2370/166; B60K 2370/167; B60K 2370/1868; B60K 2370/1876; B60K 2370/52; B60K 35/00; B60K 35/29; B60K 35/81; G09G 2340/0464; G09G 2380/10; G09G 5/38; H04N 9/3185; H04N 9/3194
See application file for complete search history.

(56) References Cited

U.S. PATENT DOCUMENTS

| 2010/0066832 | A1* | 3/2010 | Nagahara | G02B 27/01 |
| | | | | 348/148 |
| 2016/0216521 | A1 | 7/2016 | Yachida et al. | |
| 2017/0235138 | A1* | 8/2017 | Morohashi | H04N 13/30 |
| | | | | 359/631 |
| 2020/0398752 | A1 | 12/2020 | Matsui et al. | |
| 2020/0410963 | A1* | 12/2020 | Nagata | G09G 3/001 |
| 2021/0019867 | A1 | 1/2021 | Hayashi et al. | |
| 2021/0107356 | A1 | 4/2021 | Watanabe | |

FOREIGN PATENT DOCUMENTS

| JP | 2018-58544 | 4/2018 |
| JP | WO2018/193708 | 10/2018 |
| JP | WO2019/168156 | 9/2019 |
| JP | 2019-179214 | 10/2019 |
| WO | 2018/167844 | 9/2018 |

OTHER PUBLICATIONS

International Search Report dated Aug. 10, 2021 in International (PCT) Application No. PCT/JP2021/019531.
Extended European Search Report dated Nov. 8, 2023 in European Patent Application No. 21820862.7.

* cited by examiner

*Fig.12*

| INITIAL POSITION + ANGULAR DEVIATION AMOUNT AROUND Y-AXIS y [deg.] | IMAGE CORRECTION VALUE IN Z-AXIS DIRECTION Ea [pixel] |
|---|---|
| $\frac{-M}{100} \leq y < \frac{-(M-1)}{100}$ | Em |
| . . . | . . . |
| $-0.02 \leq y < -0.01$ | E101 |
| $-0.01 \leq y < 0.00$ | E100 |
| $0.00 \leq y < +0.01$ | E200 |
| $+0.01 \leq y < +0.02$ | E201 |
| . . . | . . . |
| $\frac{+(N-1)}{100} \leq y < \frac{+N}{100}$ | En |

Fig.14

| INITIAL POSITION + DEVIATION CORRECTION AMOUNT IN Z-AXIS DIRECTION G [pixel] | IMAGE CORRECTION VALUE IN Z-AXIS DIRECTION Eb [pixel] |
|---|---|
| $-J \leqq G < -(J-1)$ | Ej |
| . . . | . . . |
| $-2.0 \leqq G < -1.0$ | E301 |
| $-1.0 \leqq G < 0.0$ | E300 |
| $0.0 \leqq G < +1.0$ | E400 |
| $+1.0 \leqq G < +2.0$ | E401 |
| . . . | . . . |
| $+(K-1) \leqq G < +K$ | Ek |

DISPLAY SYSTEM

CROSS-REFERENCE TO RELATED APPLICATIONS

This is a continuation application of International Application No. PCT/JP2021/019531, with an international filing date of May 24, 2021, which claims priority of Japanese Patent Application No. 2020-099648 filed on Jun. 8, 2020, the content of which is incorporated herein by reference.

BACKGROUND OF THE INVENTION

1. Technical Field

The present disclosure relates to a display system that controls a display position of display content according to movement of a moving body.

2. Description of Related Art

JP 2015-101311 A discloses a vehicle information projection system that performs augmented reality (AR) display using a head-up display (HUD) device. The HUD device projects light representing a virtual image on a windshield of a vehicle, which allows a viewer being an occupant of the vehicle to visually recognize the virtual image together with an actual view of the outside of the vehicle. For example, a virtual image representing a guide route of the vehicle is displayed in association with a display target (for example, a road) in the actual view. Accordingly, the occupant can check the guide route while visually recognizing the actual view. The vehicle information projection system described in JP 2015-101311 A includes a vehicle speed sensor, and corrects a display position of a virtual image according to acceleration. Accordingly, the occurrence of positional deviation of the virtual image at the time of sudden deceleration and sudden acceleration of the vehicle is suppressed.

SUMMARY

The present disclosure provides a display system that suppresses positional deviation of a display position of display content.

A display system of the present disclosure which controls a display of display content, includes: a processor; and a memory having stored thereon instructions executable by the processor. The instructions include: performing image correction involving a change in a display position of the display content based on image correction data stored in advance; detecting an attitude change amount of a moving body; calculating, after the image correction is performed, a correction amount of the display position of the display content based on the attitude change amount of the moving body and an image correction error of the image correction caused by vibration correction processing of correcting a display deviation caused by an attitude variation of the moving body, and controlling the display position of the display content based on the correction amount.

These general and specific aspects may be implemented by a system, a method, and a computer program, and a combination thereof.

According to the display system of the present disclosure, positional deviation of the display position of the display content can be suppressed.

BRIEF DESCRIPTION OF THE DRAWINGS

FIG. 12 is a diagram showing an example of a first correction value table including the first correction value of the image correction assigned to the deviation amount from the initial position of the display content.

FIG. 14 is a diagram showing an example of a second correction value table including the second correction value of the image correction assigned to the deviation correction amount from the initial position of the display content.

DETAILED DESCRIPTION (Knowledge Underlying Present Disclosure)

Figure 1:
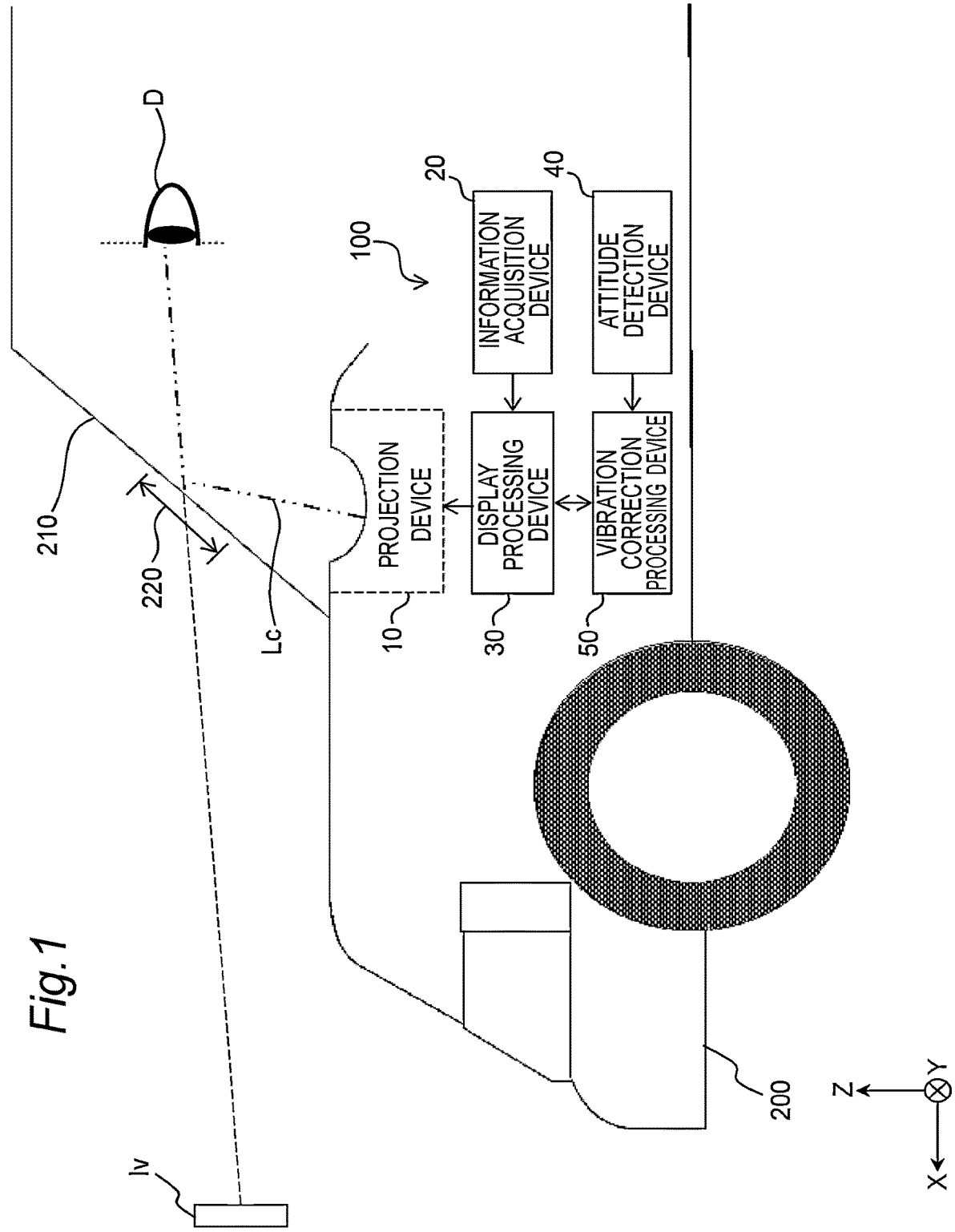
FIG. 1 is a diagram for illustrating a head-up display (HUD).

In a display system, it is known to electronically correct a display position of display content (for example, an arrow, a graphic, a character, or the like) displayed in a display area according to a state (for example, an attitude) of a moving body detected based on an output of a sensor. For example, the display system performs vibration correction processing of correcting the display position of the display content based on the vibration of the moving body detected by the sensor.

In such a display system, when the display content is displayed in a display area, distortion, rotational deviation, or the like may occur in a displayed image. For example, when display content is displayed in front of a windshield of a vehicle being a moving body, distortion of the display content may occur when the display content is reflected off the windshield. Alternatively, the display content may be displayed in an inclined manner due to variations or the like during manufacturing of the display system. Therefore, in the display system, image correction processing of changing the display position of the display content is performed in order to correct distortion, rotational deviation, and the like of the display content.

For example, at the time of manufacture or design, the display system acquires information such as distortion and rotational deviation when the display content is displayed in the display area, and stores image correction data calculated based on the information in the storage. The image correction data includes information on a correction value for correcting a deviation of the display position of the display content such as distortion or rotational deviation. The display system corrects distortion, rotational deviation, and the like by performing image correction processing based on image correction data stored in advance in the storage.

However, when both the vibration correction processing and the image correction processing are performed, the display position of the display content may be displayed to be deviated from the target display position.

For example, when the vibration correction processing is performed after the image correction processing is performed, the image correction values of the image correction processing assigned at the respective positions before and after the vibration correction processing may be different. For example, when the display content is moved from the first position to the second position due to performing the vibration correction processing, the image correction processing is desirably performed with the image correction value at the second position instead of the image correction value at the first position. However, the image correction processing is performed with the image correction value at the first position before the display position is changed due to the vibration correction in some cases. Therefore, an image correction error occurs due to the image correction processing, and the display position of the display content is displayed to be deviated from the target display position.

In addition, when the image correction processing is performed after the vibration correction processing is performed, since the image correction processing requires more time than the vibration correction processing, the attitude of the moving body may change while the image correction processing is performed, and the vibration correction amount of the vibration correction processing may change. That is, a delay time is caused from the vibration correction processing to the display of the content by the performing of the image correction processing, and thus, a vibration correction error due to the vibration correction processing occurs. Accordingly, the display position of the display content is displayed to be deviated from the target display position.

The display system of the present disclosure performs the vibration correction processing after performing the image correction processing. In addition, in the vibration correction processing, the vibration correction amount of the display position of the display content is calculated based on the attitude change amount of the moving body and the image correction error of the image correction caused by the vibration correction processing of correcting the display deviation caused by the attitude variation of the moving body. Accordingly, positional deviation of the display position of the display content is suppressed.

First Embodiment

Hereinafter, a first embodiment will be described with reference to the drawings. In the first embodiment, a case where the moving body is a vehicle such as an automobile and the display system is a head-up display (HUD) system that displays display content in front of a windshield of the vehicle will be described as an example.

1. Configuration of Display System

A configuration of a display system of the present embodiment will be described with reference to FIGS. 1 and 2.

FIG. 1 is a diagram for illustrating an HUD system. In FIG. 1, a roll axis of the vehicle 200 is an X-axis, a pitch axis of the vehicle 200 is a Y-axis, and a yaw axis of the vehicle 200 is a Z-axis. That is, the X-axis is orthogonal to the Y-axis and the Z-axis, and is an axis along the sight line direction of the occupant D who visually recognizes the display content Iv. The Y-axis is an axis along the left-right direction as viewed from the occupant D who visually recognizes the display content Iv. The Z-axis is an axis along the height direction of the vehicle 200.

The display system 100 of the present embodiment is an HUD system that performs what is called augmented reality (AR) display in which the display content Iv is superimposed on an actual view in front of the windshield 210 of the vehicle 200. The display content Iv is content indicating predetermined information displayed in the display area 220. For example, the display content Iv is graphics and characters indicating a route for guiding to a destination, an expected arrival time at the destination, a traveling direction, a speed, various warnings, and the like. In the present embodiment, an arrow indicating a route for guiding to a destination will be described as an example of the display content Iv. The display system 100 is installed in the vehicle 200, and projects the display light Lc representing the display content Iv onto within the display area 220 of the windshield 210 of the vehicle 200. In the present embodiment, the display area 220 is a partial area of the windshield 210. It should be noted that the display area 220 may be the entire area of the windshield 210. The display light Lc is reflected by the windshield 210 toward the vehicle interior. Thus, the occupant D in the vehicle 200 visually recognizes the reflected display light Lc as the display content Iv in front of the vehicle 200.

The display system 100 includes a projection device 10, an information acquisition device 20, a display processing device 30, an attitude detection device 40, and a vibration correction processing device 50.

The projection device 10 projects the display light Lc representing the display content Iv onto within the display area 220. The projection device 10 includes, for example, a liquid crystal display element that displays an image of the display content Iv, a light source such as an LED that illuminates the liquid crystal display element, a mirror and a lens that reflect the display light Lc of the image displayed by the liquid crystal display element onto the display area 220, and the like. The projection device 10 is installed, for example, within a dashboard of the vehicle 200.

The information acquisition device 20 acquires information indicating the position of the vehicle 200. Specifically, the information acquisition device 20 measures the position of the vehicle 200 and generates positional information indicating the position. The information acquisition device 20 outputs vehicle-related information including positional information of the vehicle 200.

The display processing device 30 controls the display of the display content Iv based on the vehicle-related information or the like obtained from the information acquisition device 20, and outputs the image data on the display content Iv to the projection device 10. The display processing device 30 may control the display of the display content Iv based on a display timing (display time) of the display content Iv or a combination of the vehicle-related information and the display timing. The display timing is, for example, to repeat display for 10 seconds and non-display for 1 second. In addition, the display processing device 30 performs image correction processing entailing a change in the display position of the display content Iv based on the image correction data, and corrects display deviation such as distortion or rotational deviation of the display content Iv.

The attitude detection device 40 detects an attitude variation of the vehicle 200. Specifically, the attitude detection device 40 detects an attitude change amount of the vehicle 200. The attitude change amount is an angular velocity.

In the present embodiment, the attitude detection device 40 includes, for example, a gyro sensor 41 (see FIG. 2) that detects an angular velocity. The gyro sensor 41 outputs the detected angular velocity to the vibration correction processing device 50 as an attitude change amount indicating an attitude variation of the vehicle 200.

The vibration correction processing device 50 calculates the vibration correction amount of the display position of the display content Iv based on the attitude variation of the vehicle 200 detected by the attitude detection device 40 and the image correction error of the image correction processing caused by the attitude variation. The vibration correction processing device 50 outputs the calculated vibration correction amount to the display processing device 30. Accordingly, the display content Iv is corrected in display position within the display area 220 according to the change in the actual view seen from the windshield 210.

Figure 2:
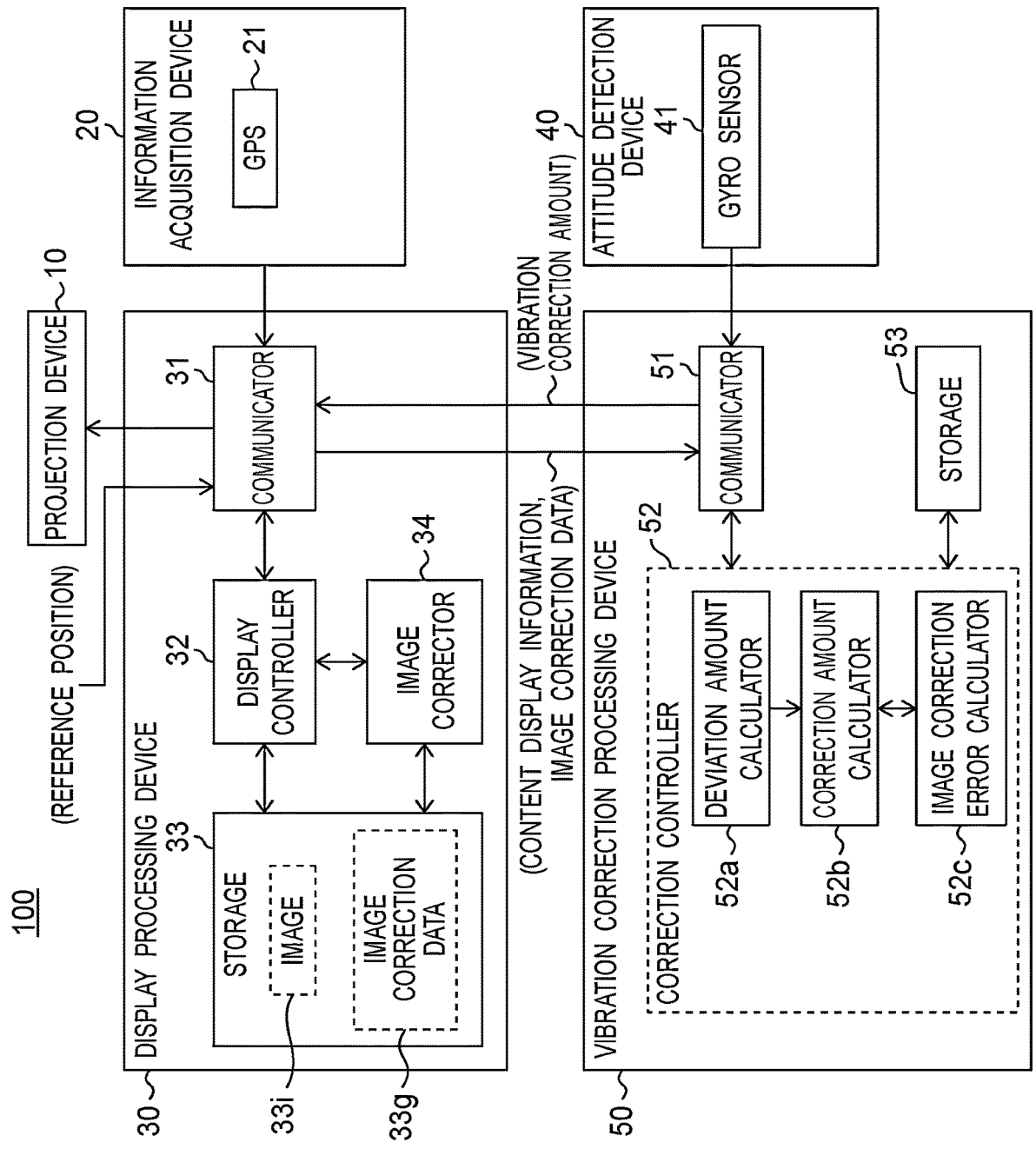
FIG. 2 is a block diagram showing an internal configuration of a display system in a first embodiment.

FIG. 2 is a block diagram showing an internal configuration of the display system 100.

In the present embodiment, the information acquisition device 20 includes a global positioning system (GPS) module 21 that detects a position indicating the current location of the vehicle 200 in the geographic coordinate system. Specifically, the GPS module 21 receives a radio wave from a GPS satellite and positions the latitude and longitude of the received point. The GPS module 21 generates positional information indicating the positioned latitude and longitude. The information acquisition device 20 outputs vehicle-related information including positional information to the display processing device 30.

The display processing device 30 includes a communicator 31, a display controller 32, a storage 33, and an image corrector 34.

The communicator 31 includes a circuit that communicates with an external apparatus in conformity with a predetermined communication standard. The predetermined communication standard includes, for example, LAN, Wi-Fi (registered trademark), Bluetooth (registered trademark), USB, HDMI (registered trademark), controller area network (CAN), and serial peripheral interface (SPI).

The display controller 32 can be achieved with a semiconductor element or the like. The display controller 32 can include, for example, a microcomputer, a CPU, an MPU, a GPU, a DSP, an FPGA, or an ASIC. The function of the display controller 32 may be configured only by hardware, or may be implemented by combining hardware and software. The display controller 32 reads data and programs stored in the storage 33 and performs various arithmetic processing to implement a predetermined function.

The storage 33 is a storage medium that stores programs and data necessary for implementing the functions of the display processing device 30. The storage 33 can be implemented by, for example, a hard disk (HDD), an SSD, a RAM, a DRAM, a ferroelectric memory, a flash memory, a magnetic disk, or a combination thereof.

The storage 33 stores a plurality of pieces of image data 33i representing the display content Iv. In addition, the storage 33 stores image correction data 33g used for image correction processing.

The image correction data 33g includes, for example, an image correction value for correcting a display deviation such as a distortion and/or a rotational deviation of an image representing the display content Iv. The image correction value is, for example, known data calculated based on the distortion and/or the rotational deviation of an image measured by inspection at the time of manufacturing the display system 100, and is a static value.

In the present specification, the distortion is, for example, distortion generated when the display content Iv is reflected by the windshield 210 when the display content Iv is displayed in front of the windshield 210 of the vehicle 200. The rotational deviation is, for example, deviation caused by installation variations such as a case where the projection device 10 is installed to be inclined with respect to the windshield 210 onto which light is projected from the projection device 10.

For example, the display area 220 may be divided into a plurality of partitioned areas, and the image correction data 33g may store the image correction value assigned to each of the plurality of partitioned areas. Specifically, the image correction data 33g may store an image correction table indicating the image correction value assigned to each of the plurality of partitioned areas.

It should be noted that in the present embodiment, an example has been described in which the image correction data 33g includes an image correction value for correcting distortion and/or rotational deviation, but the present disclosure is not limited thereto. The image correction data 33g may include an image correction value for correcting a display deviation that causes a change in the display position of the display content Iv other than distortion and/or rotational deviation.

The image corrector 34 performs image correction involving a change in the display position of the display content Iv based on the image correction data 33g stored in advance in the storage 33. The image correction involving a change in the display position of the display content Iv includes, for example, image distortion correction and/or correction of the image rotational deviation or the like.

The image corrector 34 corrects distortion, rotational deviation, and/or the like of the display content Iv projected onto the windshield 210 of the vehicle 200 by the projection device 10.

For example, the image corrector 34 reads the image correction data 33g stored in advance in the storage 33, and determines an image correction value for correcting the display deviation of the display position of the display content Iv caused by distortion, rotational deviation, and/or the like. The image corrector 34 determines the image correction value using the image correction table of the image correction data 33g.

The image correction value determined by the image corrector 34 is output to the display controller 32.

It should be noted that the image corrector 34 may be included in the display controller 32.

The display controller 32 determines the display content Iv to be displayed in the display area 220 based on the vehicle-related information obtained from the information acquisition device 20. The display controller 32 reads the image data 33i on the determined display content Iv from the storage 33 and outputs the image data to the projection device 10.

The display controller 32 acquires information indicating the display reference position from an external device (not shown) through the communicator 31. The display reference position is a position serving as a reference of display of the display content Iv in the display area 220.

The display controller 32 acquires content information indicating information on the display content Iv. The content information includes, for example, information such as a shape, a size, a display end, and a display reference position of the display content Iv. In the present specification, information on the display content including the display reference position and the content information (for example, information such as the size of the display content) is referred to as content display information. The content display information includes a feature portion that determines the shape of the display content at least. The feature portion is, for example, a pixel position of content display. The content display information is stored in the storage 33 together with the image data 33i. In addition, the display controller 32 acquires vehicle-related information from the information acquisition device 20 through the communicator 31, and determines image data to be used among the plurality of pieces of image data 33i stored in the storage 33 based on the vehicle-related information. Accordingly, the display controller 32 acquires information indicating the shape, size, display end, and the like of the display content Iv.

The display controller 32 outputs the content display information to the vibration correction processing device 50.

The display controller 32 acquires the image correction value of the display content Iv from the image corrector 34, and changes the display position of the display content Iv based on the image correction value. In addition, the display controller 32 acquires the vibration correction amount from the vibration correction processing device 50. The display controller 32 sets the display position of the display content Iv based on the display reference position and the vibration correction amount.

The attitude detection device 40 includes a gyro sensor 41 that detects an angular velocity. The gyro sensor 41 outputs the detected angular velocity to the vibration correction processing device 50 as an attitude change amount indicating an attitude variation of the vehicle 200.

The arithmetic processing of the output of the attitude detection device 40 may be performed by the attitude detection device 40, the deviation amount calculator 52a of the vibration correction processing device 50, or another configuration.

The vibration correction processing device 50 includes a communicator 51, a correction controller 52, and a storage 53.

The communicator 51 includes a circuit that communicates with an external apparatus in conformity with a predetermined communication standard. The predetermined communication standard includes, for example, LAN, Wi-Fi (registered trademark), Bluetooth (registered trademark), USB, HDMI (registered trademark), controller area network (CAN), and serial peripheral interface (SPI).

The correction controller 52 can be achieved with a semiconductor element or the like. The correction controller 52 can include, for example, a microcomputer, a CPU, an MPU, a GPU, a DSP, an FPGA, or an ASIC. The function of the display controller 32 may be configured only by hardware, or may be implemented by combining hardware and software. The correction controller 52 reads data and programs stored in a storage (not shown) in the vibration correction processing device 50 and performs various arithmetic processing, to implement a predetermined function.

The correction controller 52 includes a deviation amount calculator 52a, a correction amount calculator 52b, and an image correction error calculator 52c as functional configurations.

The deviation amount calculator 52a calculates the attitude (angle deviation amount) of the vehicle 200 based on the attitude change amount output by the attitude detection device 40. The angle deviation amount is an attitude angle with respect to an attitude state serving as a reference of the moving body. The attitude state serving as a reference of the moving body is, for example, a vehicle state in a stationary state placed in a horizontal state. For example, the deviation amount calculator 52a calculates the angle (pitch angle) around the pitch axis of the vehicle 200 by performing integration operation on the angular velocity detected by the gyro sensor 41. Accordingly, it is possible to calculate the deviation amount (angle) of the vehicle 200 in the rotation direction around the Y-axis (pitch axis) shown in FIG. 1. It should be noted that in the present embodiment, the pitch angle is calculated, but the yaw angle or the roll angle may be calculated. For example, all the angles around the X-axis, the Y-axis, and the Z-axis may be calculated. In an attitude state in which the moving body is a reference, the pitch angle, the yaw angle, and the roll angle are each 0°. In this manner, the deviation amount being an angle with respect to the triaxial direction may be calculated. It should be noted that when the attitude detection device 40 outputs the pitch angle, the yaw angle, and the roll angle, these values may be processed as the deviation amount.

The correction amount calculator 52b calculates the correction amount (vibration correction amount) of the display position of the display content Iv based on the attitude (angle deviation amount) of the vehicle 200 and the image correction error of the image correction processing caused by the vibration correction processing of correcting the display deviation caused by the attitude variation of the vehicle 200. Specifically, the correction amount calculator 52b calculates the vibration correction amount based on the deviation amount calculated by the deviation amount calculator 52a and the image correction error calculated by the image correction error calculator 52c.

The image correction error calculator 52c calculates an image correction error of the image correction processing caused by the vibration correction processing of correcting the display deviation caused by the attitude variation of the vehicle 200. Specifically, the image correction error calculator 52c calculates the initial position of the display content Iv based on the content display information output from the display processing device 30. The initial position means the display position of the display content Iv when the vibration correction amount is "0". For example, the initial position may be a display reference position first acquired from an external device, or may be a position of a feature portion of the display content Iv when the vibration correction amount is "0".

In the present embodiment, the initial position is the display position of the feature portion of the display content Iv when the vibration correction amount is "0". For example, when the display content Iv is an arrow, the feature portion is a tip portion of the arrow. In this case, the initial position is the display position of the tip portion of the arrow.

Figure 3A:
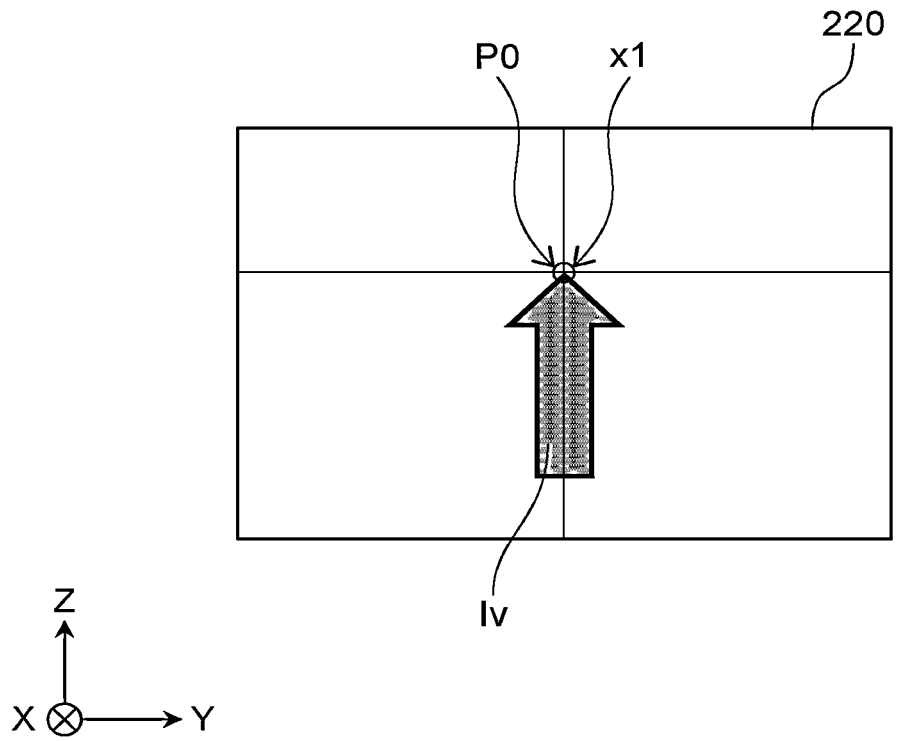
FIG. 3A is a view showing an example of an initial position of display content.
Figure 3B:
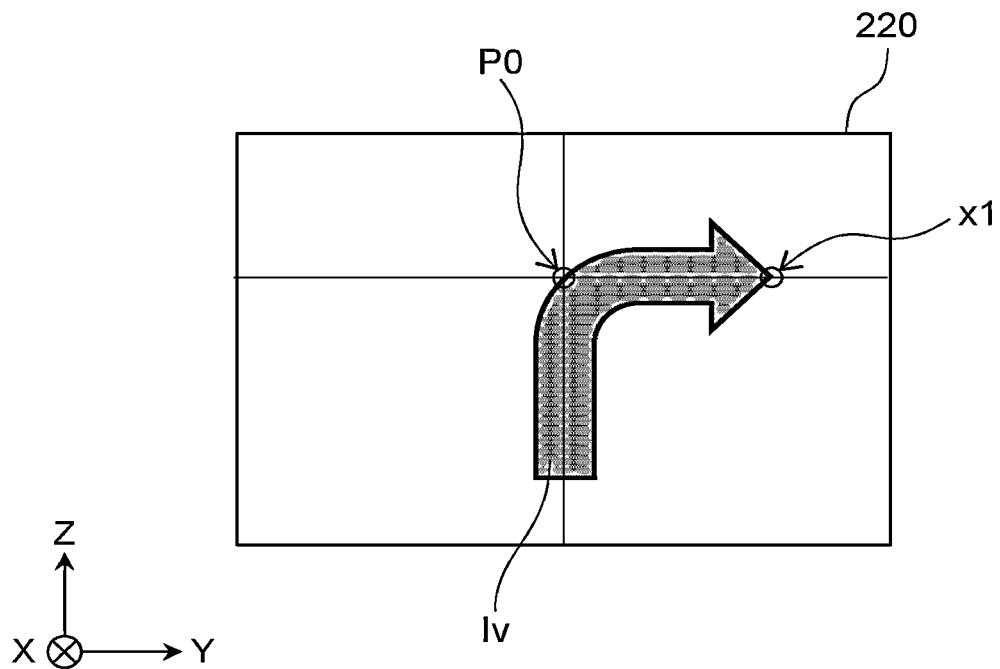
FIG. 3B is a view showing another example of an initial position of display content.

FIG. 3A is a view showing an example of the initial position x1 of the display content Iv. The display content Iv shown in FIG. 3A is an arrow having a linear shape extending in one direction. In the example shown in FIG. 3A, the initial position x1 of the display content Iv coincides with a display reference position P0 being the display position of the display content Iv when the vibration correction amount is "0". FIG. 3B is a view showing another example of the initial position x1 of the display content Iv. The display content Iv shown in FIG. 3B is an arrow having a shape bent by 90°. In the example shown in FIG. 3B, the initial position x1 of the display content Iv is different from the display reference position P0.

The image correction error calculator 52c acquires the image correction value (image correction data) from the display processing device 30 through the communicator 31. The image correction error calculator 52c calculates the image correction error based on the initial position of the display content Iv, the deviation amount calculated by the deviation amount calculator 52a, and the image correction value (image correction data) acquired from the display processing device 30.

For example, the image correction error calculator 52c acquires the correction value (first image correction value) of the image correction at the initial position of the display content Iv. In addition, the image correction error calculator 52c acquires the correction value (second image correction value) of the image correction at the display position of the display content Iv to be displayed when the vibration correction is performed based on the deviation amount calculated by the deviation amount calculator 52a. The image correction error calculator 52c calculates the image correction error by subtracting the first image correction value from the second image correction value. That is, the image correction error is a difference between the first image correction value at the initial position of the display content Iv and the second image correction value at the display position of the display content Iv after vibration correction based on the deviation amount calculated by the deviation amount calculator 52a.

In the present embodiment, the image correction error calculator 52c stores the correction value table to which the correction value of the image correction corresponding to the deviation amount from the initial position is assigned. For example, the image correction error calculator 52c includes a storage, and stores the correction value table in the storage. The image correction error calculator 52c calculates the image correction error based on the initial position, the deviation amount, and the correction value table.

In the present specification, the correction value of the image correction corresponding to the deviation amount from the initial position may be referred to as a first correction value, and the correction value table may be referred to as a first correction value table.

The vibration correction processing device 50 outputs the vibration correction amount to the display processing device 30.

As described above, the display processing device 30 and the vibration correction processing device 50 communicate bidirectionally through the communicators 31 and 51. The display processing device 30 outputs the content display information to the vibration correction processing device 50. The vibration correction processing device 50 outputs correction information indicating the vibration correction amount to the display processing device 30.

2. AR Display

Figure 4A:
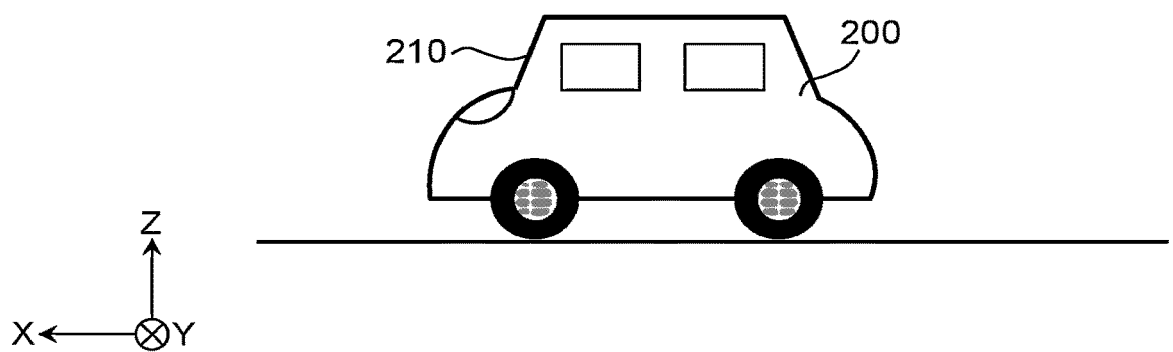
FIG. 4A is a diagram showing an example when the vehicle is not inclined.
Figure 4B:
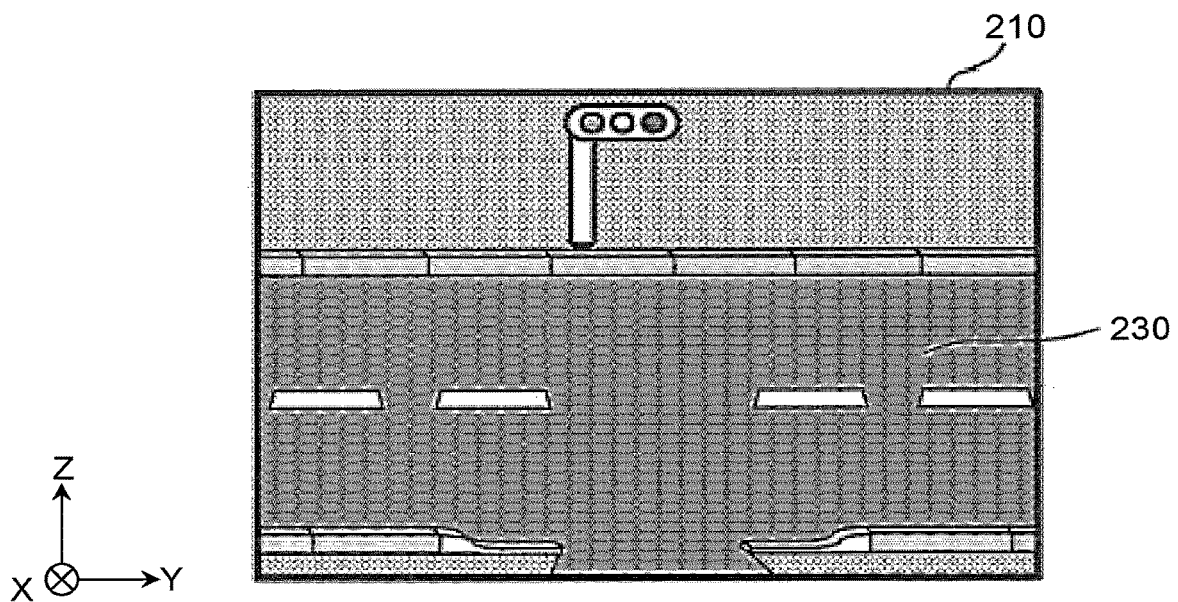
FIG. 4B is a view showing an example of an actual view visible from a windshield.
Figure 4C:
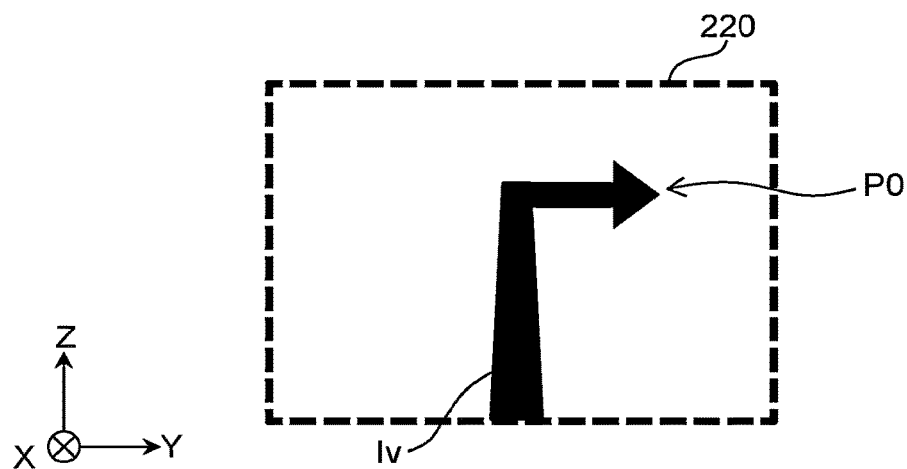
FIG. 4C is a view showing an example in which display content is displayed at a reference position.
Figure 4D:
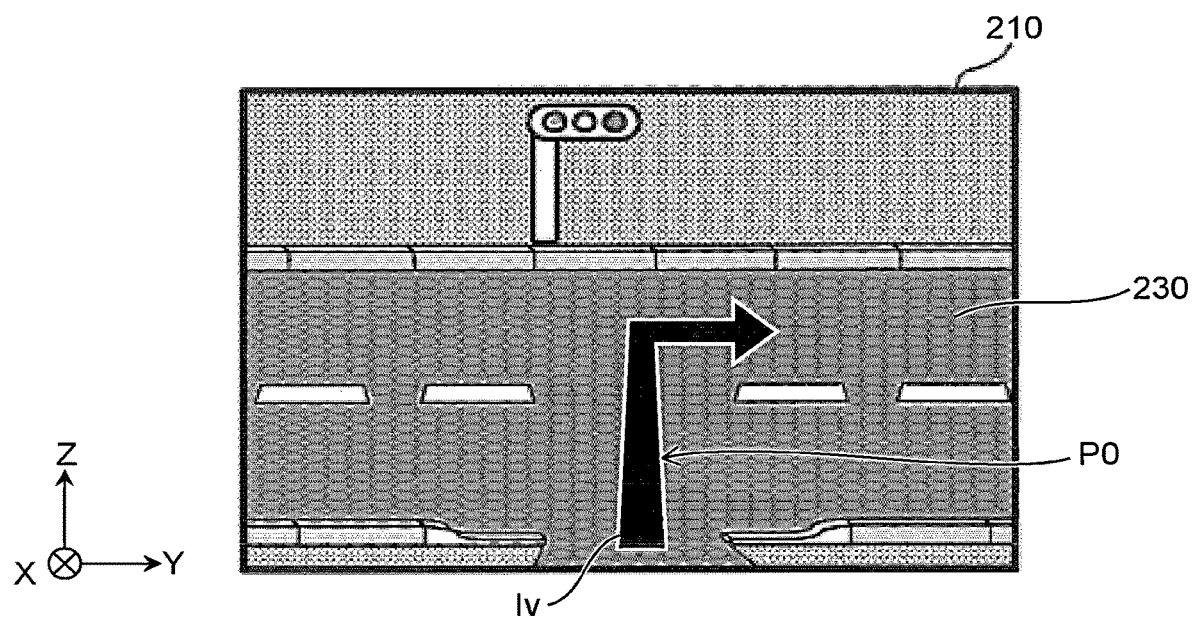
FIG. 4D is a view showing an example of augmented reality (AR) display.

The AR display will be described with reference to FIGS. 4A to 4D. FIG. 4A shows an example when the vehicle 200 is not inclined. FIG. 4B shows an example of an actual view visible from the windshield 210 of the vehicle 200 shown in FIG. 4A. FIG. 4C shows an example of display content Iv visible from the display area 220. FIG. 4D shows an example in which the display content Iv shown in FIG. 4C is displayed to be superimposed on the actual view shown in FIG. 4B. The display system 100 superimposes the display content Iv shown in FIG. 4C on the actual view shown in FIG. 4B. The display reference position P0 of the display content Iv is a position determined based on the type of the display content Iv, the state (position and attitude) of the vehicle 200, map data, and the like. For example, when the display target 230 is a traveling lane and the display content Iv is an arrow indicating the traveling direction, the display reference position P0 is a display position on the liquid crystal when the tip of the arrow points the center of the traveling lane. For example, in FIG. 4C, the display reference position P0 is set at the position of the pixel on the liquid crystal display corresponding to the values of the Y coordinate and the Z coordinate in the display area 220. The display reference position P0 is acquired from an external device. The external device can include, for example, a microcomputer, a CPU, an MPU, a GPU, a DSP, an FPGA, or an ASIC, and the GPS module 21. The function of the external device may be configured only by hardware, or may be implemented by combining hardware and software. The display reference position P0 output from the external device may change based on variation in attitude, due to the number of occupants, variation in load, a decrease in gasoline, and the like, and thus may be different from the display reference position acquired first, for example. Therefore, the display processing device 30 may change the display reference position P0 acquired from the external device based on variation in attitude, due to the number of occupants, variation in load, a decrease in gasoline, and the like. It should be noted that the display processing device 30 may set the display reference position P0 based on the vehicle-related information, the map data, and the like. The display processing device 30 may set the size of the display content Iv based on the vehicle-related information.

3. Vibration Correction Processing of Display of Display Content

Figure 5A:
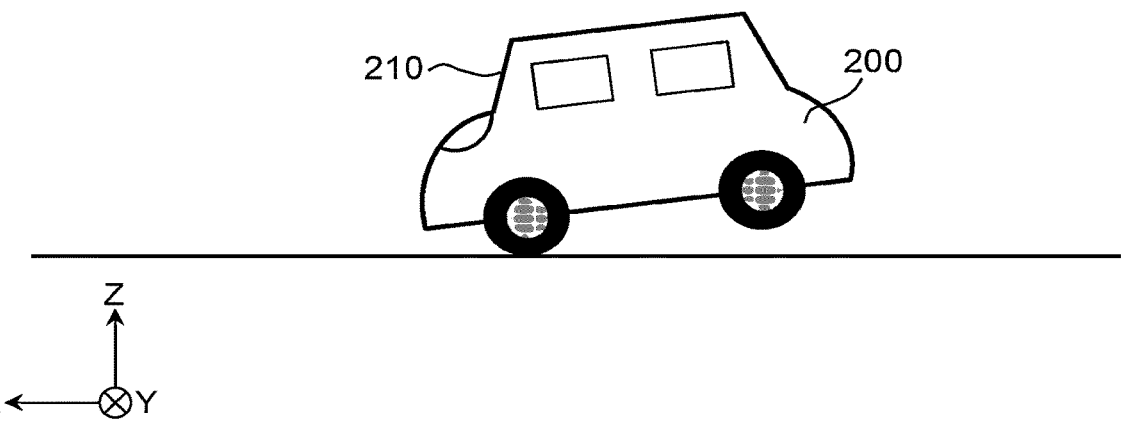
FIG. 5A is a view showing a backward tilting attitude of the vehicle.
Figure 5B:
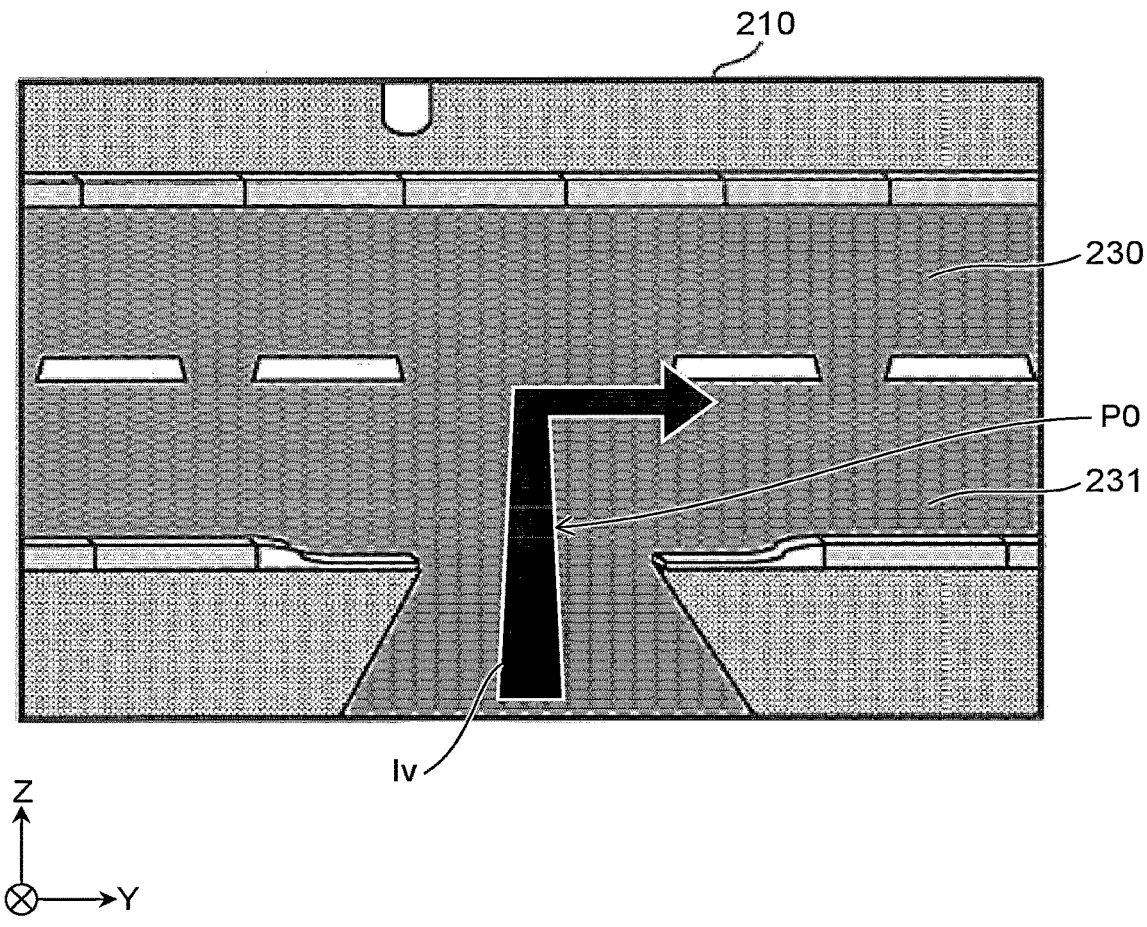
FIG. 5B is a view for illustrating an example in which positional deviation of display content occurs when the vehicle is in a backward tilting attitude.
Figure 5C:
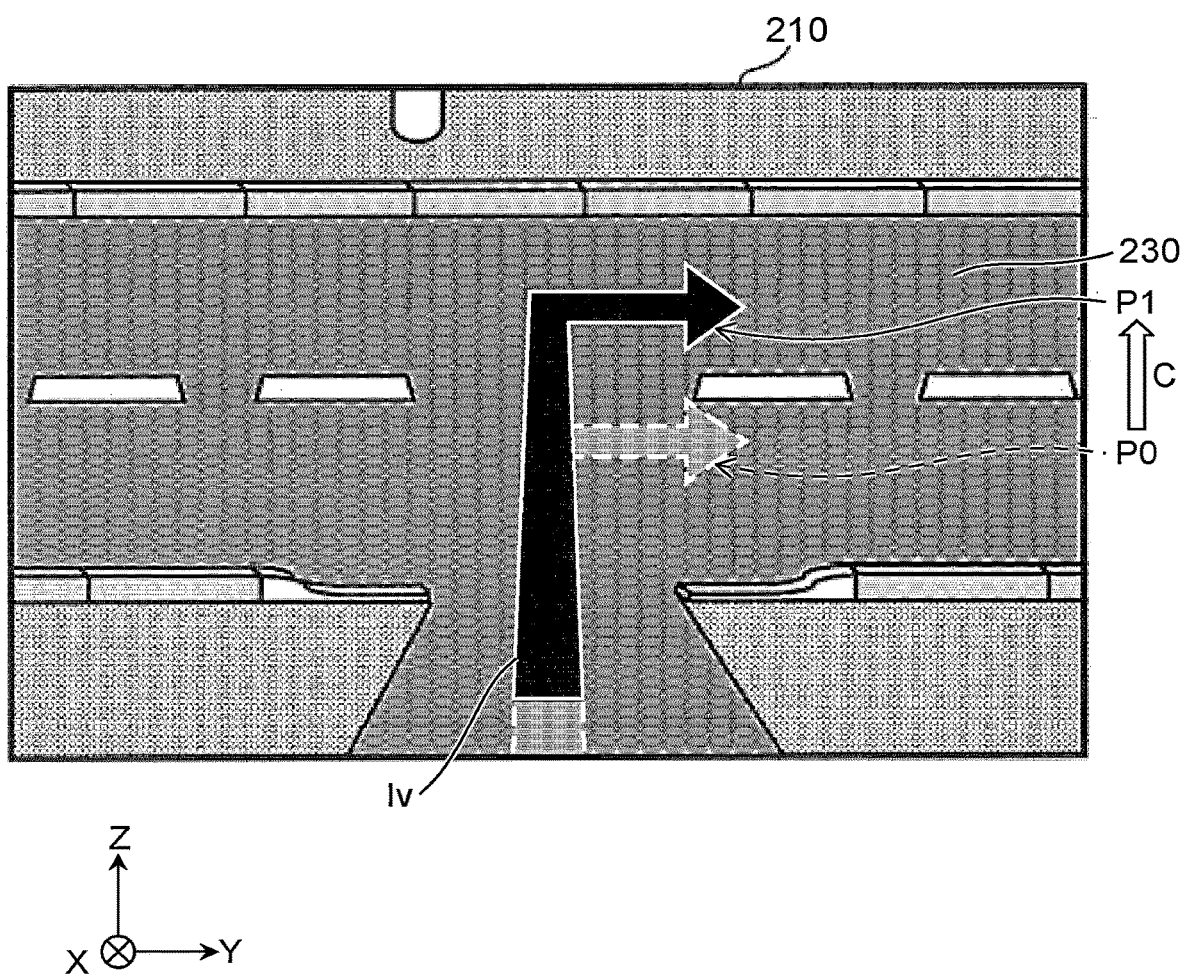
FIG. 5C is a view showing a display example of display content after the vibration correction processing.

The vibration correction processing of the display of the display content Iv will be described with reference to FIGS. 5A to 5O. FIG. 5A shows an example of a state in which the vehicle 200 is in a forward tilting attitude. FIG. 5B illustrates a case where the display position of the display content Iv is deviated from the display target 230 according to the attitude variation of the vehicle 200. FIG. 5C shows the display position of display content Iv after the vibration correction.

The vehicle 200 may incline due to unevenness of a road surface, sudden acceleration or sudden deceleration of the vehicle 200, or the like. For example, when the vehicle 200 suddenly decelerates, the vehicle 200 takes a forward tilting attitude as shown in FIG. 5A. In this case, as shown in FIG. 5B, the position of the display target 230 visible from the windshield 210 varies according to the inclination of vehicle 200. Therefore, when the display content Iv is displayed at the display reference position P0, the display content Iv is deviated from the display target 230. For example, as shown in FIG. 5B, the tip of the arrow is inside the opposite lane 231. Therefore, the display system 100 adjusts the display position of the display content Iv in the direction in which the deviation according to the attitude of the vehicle 200 is returned. Specifically, as shown in FIG. 5C, the vibration correction processing device 50 calculates the vibration correction amount C so as to be a position P1 where there is no deviation in the display position due to the angle of the vehicle 200. That is, the display processing device 30 sets the display position of the display content Iv to "display reference position P0+vibration correction amount C". Accordingly, the projection device 10 can display the display content Iv at the position P1 corresponding to the display target 230. As described above, even when the vehicle 200 is inclined, by changing the display position of the display content Iv from the display reference position P0 based on the vibration correction amount C, the display content Iv can be displayed at the position P1 corresponding to the display target 230 in the actual view.

4. Image Correction Processing of Display of Display Content

Figure 6:
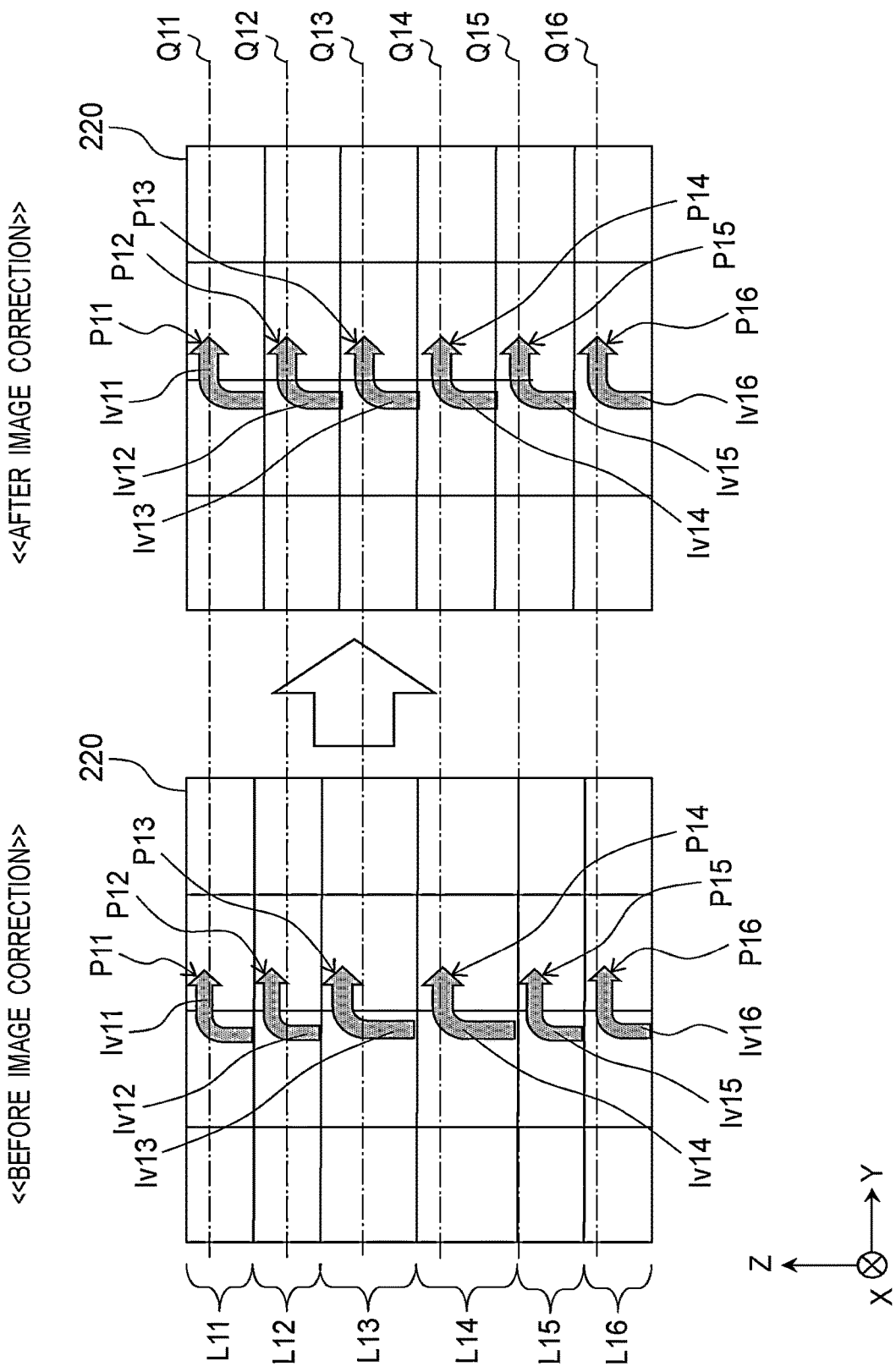
FIG. 6 is an image diagram for illustrating image correction processing.

The image correction processing of the display of the display content Iv will be described with reference to FIG. 6. FIG. 6 is an image diagram for illustrating image correction processing. In the example shown in FIG. 6, distortion correction processing when distortion occurs in the vertical direction of the display area 220 will be described. As shown in FIG. 6, when the display area 220 is divided into a plurality of partitioned areas, the sizes of the plurality of partitioned areas are different due to distortion. In the example shown in FIG. 6, in the vertical direction of the display area 220, the sizes of the upper side areas L11 and L12 and the lower side areas L15 and L16 are smaller than those of the partitioned areas without distortion. In addition, the sizes of the central areas L13 and L14 are larger than those of the partitioned areas without distortion. In this case, the sizes of the display content Iv11 to Iv16 to be displayed in the respective partitioned areas are changed, and the display positions P11 to P16 at the tips of the arrows being feature portions of the display content Iv11 to Iv16 are deviated from the superimposing positions Q11 to Q16.

The image corrector 34 performs image correction involving a change in the display position of the display content Iv based on the image correction data 33g stored in advance in the storage 33. Specifically, the image corrector 34 determines an image correction value using the image correction table of the image correction data 33g, and outputs the image correction value to the display controller 32. In the example shown in FIG. 6, the image corrector 34 determines the image correction value so that pieces of the display content Iv11, Iv12, Iv15, and Iv16 increase in size in the vertical direction in the upper side areas L11 and L12 and the lower side areas L15 and L16. In addition, the image corrector 34 determines the image correction value so that pieces of the display content Iv13 and Iv14 decrease in size in the vertical direction in the central areas L13 and L14. Accordingly, the display controller 32 can control the display positions P11 to P16 of pieces of the display content Iv11 to Iv16 based on the determined image correction value to superimpose the pieces of display content on the superimposing positions Q11 to Q16.

Figure 7A:
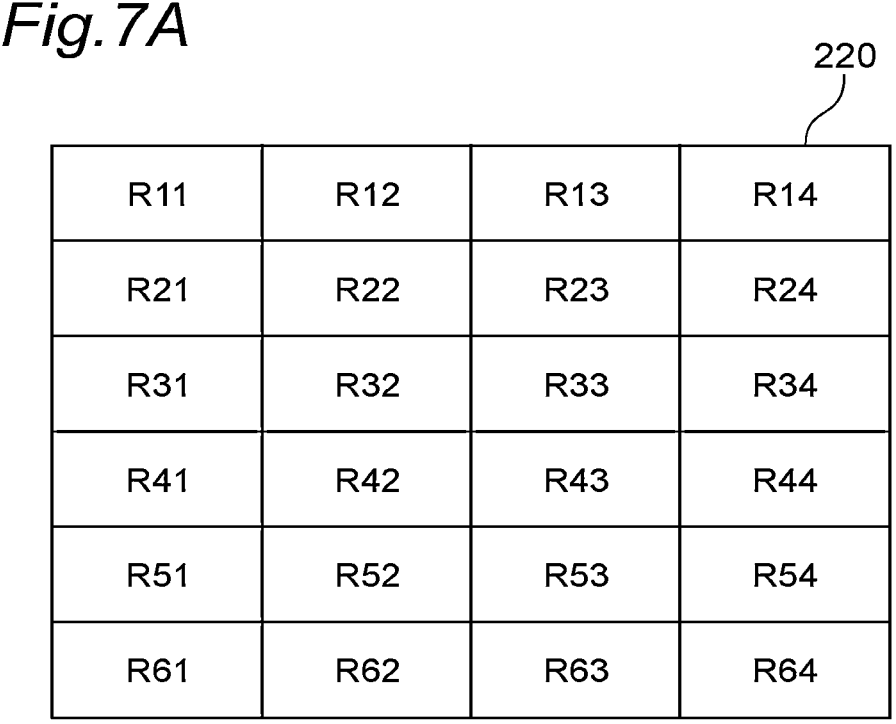
FIG. 7A is a diagram showing an example of a plurality of partitioned areas in a display area.

The determination of the image correction value will be described with reference to FIGS. 7A and 7B. FIG. 7A shows an example of a plurality of partitioned areas R11 to R64 in the display area 220. As shown in FIG. 7A, the display area 220 in which the display content Iv is displayed has a plurality of partitioned areas R11 to R64. For example, the plurality of partitioned areas R11 to R64 are partitioned into a mesh shape vertically and horizontally. In the example shown in FIG. 7A, the display area 220 is divided into six vertical and four horizontal partitioned areas R11 to R64. It should be noted that in the display area 220, the number and arrangement of the partitioned areas are not limited thereto. The display area 220 only needs to have a plurality of partitioned areas.

Figure 7B:
FIG. 7B is a diagram showing an example of image correction data.

FIG. 7B shows an example of the image correction data 33g. As shown in FIG. 7B, the image correction data 33g includes an image correction table including image correction values U11 to U64 respectively assigned to the plurality of partitioned areas R11 to R64 of the display area 220. In the image correction table, the image correction values U11 to U64 of the image correction data 33g correspond to the plurality of partitioned areas R11 to R64 of the display area 220, respectively. For example, when the display content Iv is displayed in the partitioned area R22, the image correction value U22 is adopted as the image correction value.

Figure 8:
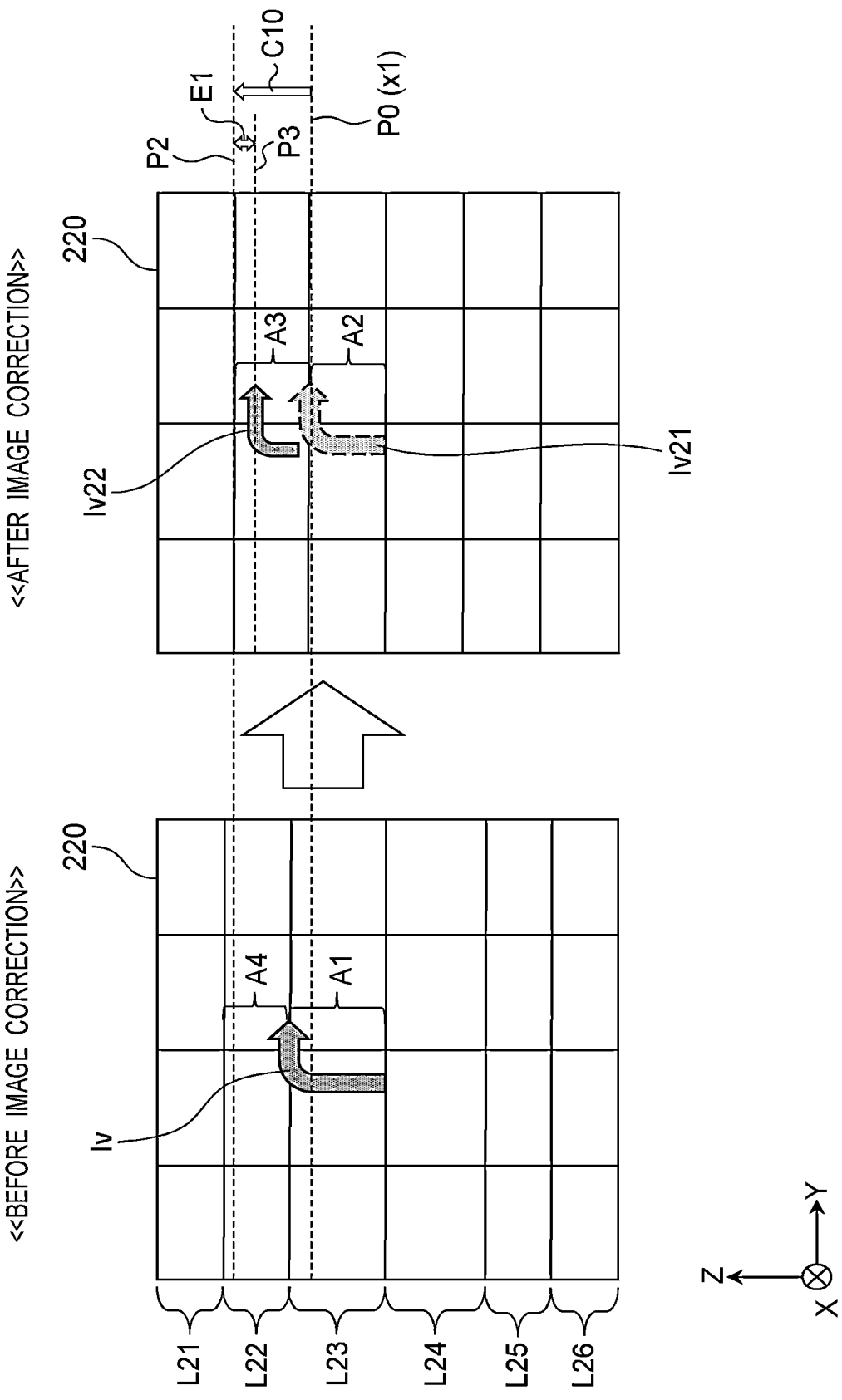
FIG. 8 is a view showing an example in which an image correction error occurs due to image correction processing when both the image correction processing and the vibration correction processing are performed.

5. Image Correction Error of Image Correction Processing Caused by Vibration Correction Processing The image correction error E1 of the image correction processing caused by the vibration correction processing will be described with reference to FIG. 8. FIG. 8 shows an example in which the image correction error E1 of the image correction processing occurs when the vibration correction processing is performed after the image correction processing is performed. In the example shown in FIG. 8, distortion occurs in the vertical direction of the display area 220. Therefore, when the display area 220 is divided into a plurality of partitioned areas, the sizes of the plurality of partitioned areas are different due to distortion.

In the example shown in FIG. 8, in the vertical direction of the display area 220, the sizes of the upper side areas L21 and L22 and the lower side areas L25 and L26 are smaller than those of the partitioned areas without distortion. In addition, the sizes of the central areas L23 and L24 are larger than those of the partitioned areas without distortion. Therefore, in the upper side areas L21 and L22 and the lower side areas L25 and L26, the display content Iv is corrected so as to increase in size in the vertical direction. In addition, in the central areas L23 and L24, the display content Iv is corrected so as to decrease in size in the vertical direction.

That is, in the image correction processing of correcting from "A1 to A2" in the central area L23 in FIG. 8, the reduction processing is applied, and the display content Iv is corrected to decrease in size in the vertical direction. In the image correction processing of correcting from "A4 to A3" in the upper side area L22 in FIG. 8, the enlargement processing is applied, and the display content Iv is corrected to increase in size in the vertical direction.

First, a case will be described where the display content Iv is displayed at the central area L23 before the correction processing, and the vibration correction amount by the vibration correction processing is "0". In this case, in the image correction processing, the reduction processing of correcting from "A1 to A2" in the central area L23 in FIG. 8 is applied, and the display content Iv is corrected to decrease in size in the vertical direction.

In the vibration correction processing, since the vibration correction amount is "0", the display position of the display content Iv is not changed by the vibration correction processing. Therefore, the display position of the display content Iv21 after the vibration correction is not changed from the display reference position P0. That is, the display content Iv21 is not deviated from the superimposing position. It should be noted that in the example shown in FIG. 8, the display content Iv is an arrow having a shape bent by 90°, and the initial position x1 is the same as the display reference position P0 in the yaw axis direction (Z-axis direction), but the present invention is not limited thereto. The initial position x1 may be different from the display reference position P0.

Next, a case will be described where the display content Iv is displayed at the central area L23 before the correction processing, and the vibration correction amount in the yaw axis direction (Z-axis direction) by the vibration correction processing is "C10". In this case, the target display position P2 of the display content Iv22 after the correction is calculated by "display reference position (initial position) P0+vibration correction amount C10". For example, when the initial position (display reference position P0) of the display content Iv when the vibration correction amount is "0" is x1, the target display position P2 is calculated by "initial position x1+vibration correction amount C10". In the example shown in FIG. 8, the display content Iv22 is displayed at the upper side area L22, one area above the central area L23 (see "A3" in FIG. 8).

When the display content Iv22 is displayed at the upper side area L22, it is preferable that the enlargement processing of enlarging from "A4 to A3" of the upper side area L22 in FIG. 8 is applied as the image correction processing. That is, when the display content Iv22 is displayed at the upper side area L22, the display content Iv is preferably corrected so as to increase in size in the vertical direction.

However, as described above, in the correction processing, the vibration correction processing is performed after the image correction processing is performed. In the example shown in FIG. 8, before the vibration correction processing is performed, that is, when the image correction processing is performed, the display content Iv is displayed at the central area L23. Therefore, in the image correction processing, the reduction processing of reducing from "A1 to A2" at the central area L23 in FIG. 8 is applied instead of the enlargement processing of enlarging from "A4 to A3" at the upper side area L22 in FIG. 8. That is, the display content Iv is corrected so as to decrease in size in the vertical direction.

As described above, when the display position of the display content Iv22 is changed by the vibration correction processing, an image correction error E1 occurs in the image correction processing performed before the vibration correction processing. Accordingly, the display content Iv22 after the correction is displayed at the display position P3 lower than the target display position P2.

Thus, in the display system 100 of the present embodiment, the vibration correction processing is performed after the image correction processing, and the vibration correction amount at the display position of the display content Iv is calculated based on the vibration and the image correction error. Accordingly, the display position of the display content Iv after the correction can be prevented from deviating from the target display position, and the decrease in the correction accuracy of the display position of the display content Iv can be prevented.

6. Operation of Display Processing Device

Figure 9:
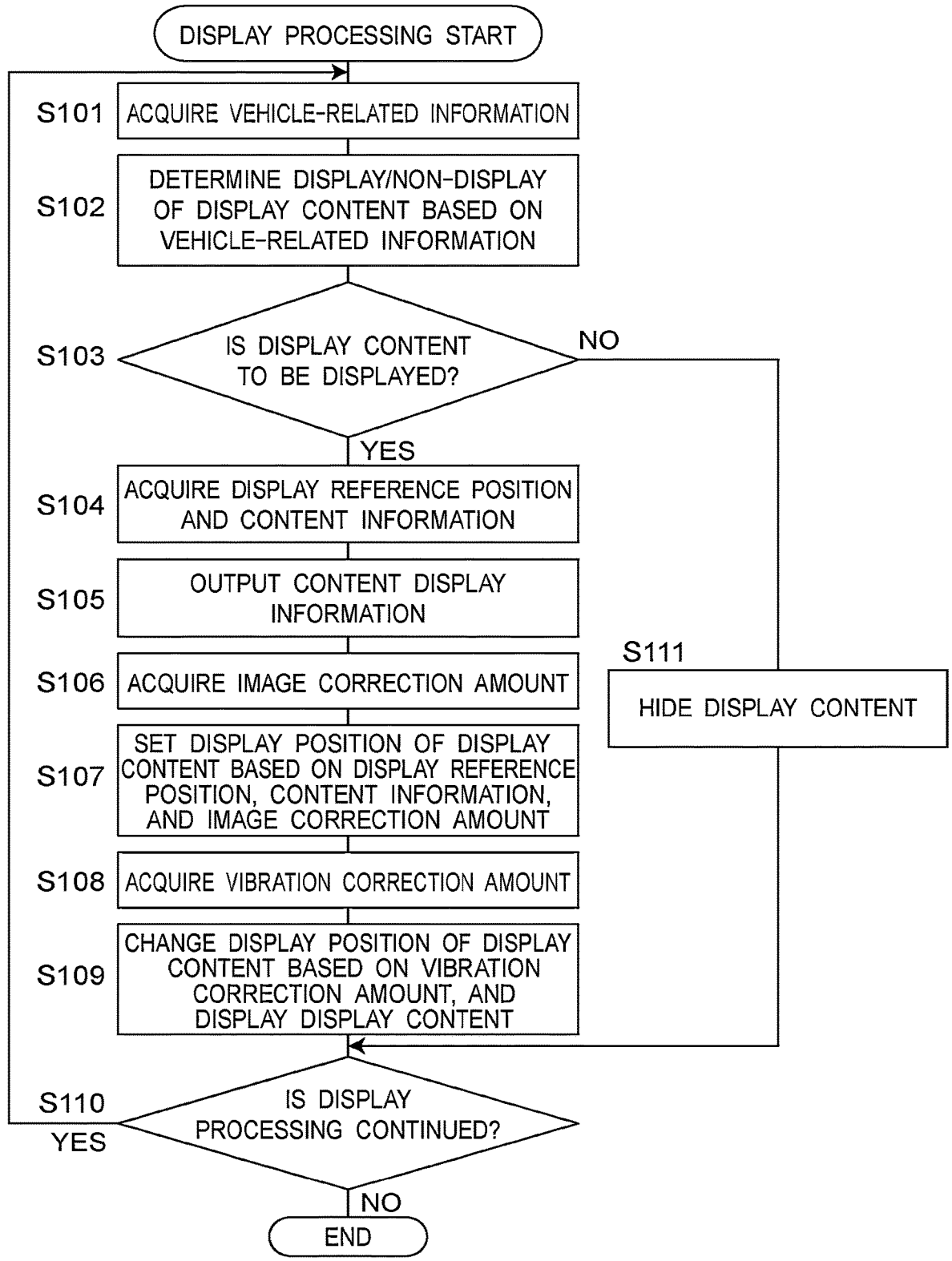
FIG. 9 is a flowchart showing display processing in the first embodiment.

The operation of the display controller 32 of the display processing device 30 will be described with reference to FIG. 9. FIG. 9 shows display processing performed by the display controller 32 of the display processing device 30. The display processing shown in FIG. 9 is started, for example, when the engine of the vehicle 200 is started, or when a button for instructing the start of the display of the display content Iv is operated.

The display controller 32 acquires vehicle-related information including positional information on the vehicle 200 from the information acquisition device 20 (S101). The display controller 32 determines whether or not to display the display content Iv corresponding to the display target 230 based on the vehicle-related information (S102).

If determining to display the display content Iv (Yes in S103), the display controller 32 acquires the information indicating the display reference position P0 of the display content Iv from the external device and acquires the content information from the storage 33 (S104). The display controller 32 outputs the content display information to the vibration correction processing device 50 (S105). For example, the content display information includes a display reference position and content information.

The display controller 32 acquires information indicating the image correction value U of the display content Iv from the image corrector 34 (S106). The display controller 32 sets the display position of the display content Iv based on the display reference position P0, the content information, and the image correction value U (S107). For example, the display controller 32 performs correction such as enlargement, reduction, and/or rotation of an image using each image correction value U on all of each area in the display area 220. After performing the image correction, the display controller 32 sets the display position of the display content Iv to the reference display position P0.

The display controller 32 acquires the vibration correction amount C calculated based on the image correction error E1 from the vibration correction processing device 50 (S108). The display controller 32 changes the display position of the display content Iv based on the display reference position P0 and the vibration correction amount C, and displays the display content Iv (S109). For example, the display controller 32 sets the display position of the display content Iv to "display reference position P0+vibration correction amount C" and outputs the display content Iv to the projection device 10.

If determining not to display the display content Iv (No in S103), the display controller 32 hides the display content Iv (S111).

The display controller 32 determines whether to continue the display processing (S110). For example, when the engine of the vehicle 200 is stopped, when a button for instructing termination of display of the display content Iv is operated, or the like, the display controller 32 terminates the display processing. If the display processing is continued, the process returns to step S101.

7. Operation of Correction Processing Device

Figure 10:
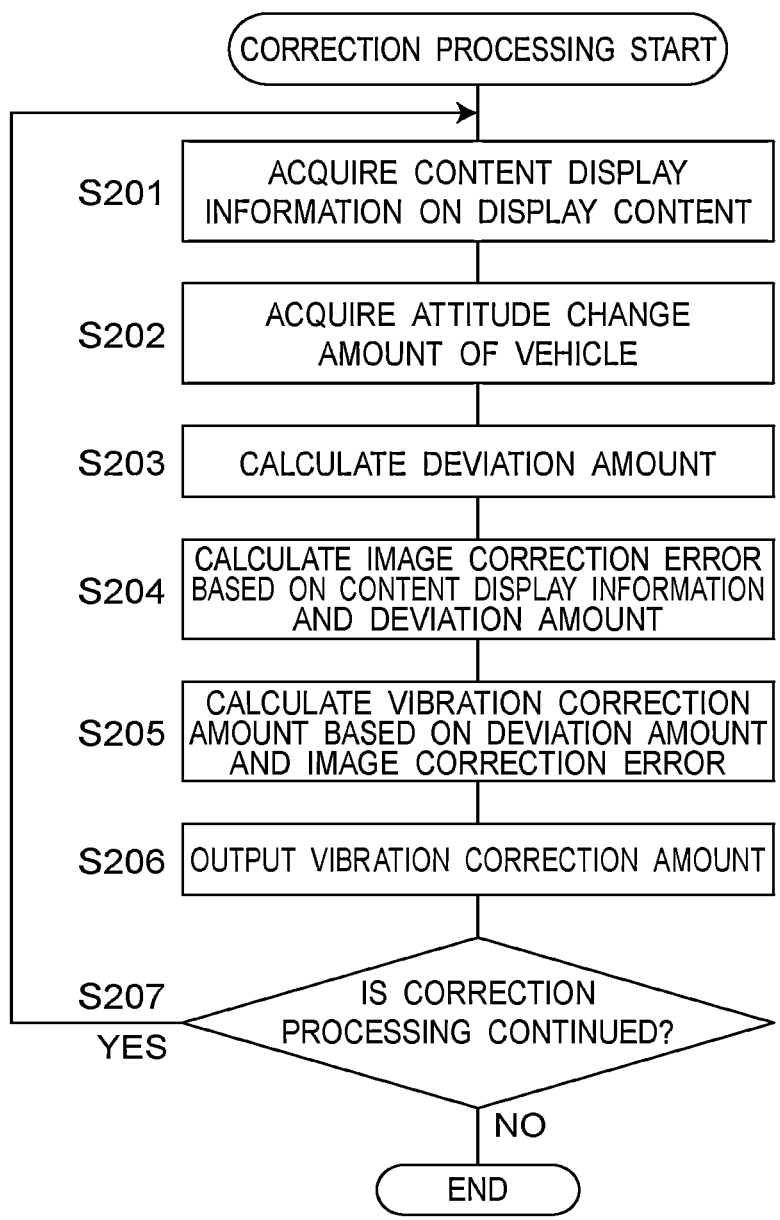
FIG. 10 is a flowchart showing correction processing in the first embodiment.

The operation of the correction controller 52 of the vibration correction processing device 50 according to the first embodiment will be described with reference to FIG. 10. FIG. 10 shows correction processing performed by the correction controller 52 of the vibration correction processing device 50.

The correction processing shown in FIG. 10 is started, for example, when the engine of the vehicle 200 is started, or when a button for instructing the start of the display of the display content Iv is operated. The correction processing in FIG. 10 is started together with the display processing in FIG. 9, for example. It should be noted that the correction processing shown in FIG. 10 may be started when a button for instructing the start of the position correction of the display content Iv is operated.

The correction controller 52 acquires the content display information on the display content Iv from the display processing device 30 (S201). The correction controller 52 acquires the attitude change amount indicating the angular velocity of the vehicle 200 output from the gyro sensor 41 (S202). The correction controller 52 calculates the attitude of the vehicle 200, that is, the deviation amount y with respect to the triaxial direction based on the attitude change amount (S203).

Based on the content display information and the deviation amount y calculated based on the attitude change amount, the correction controller 52 calculates the image correction error E1 of the image correction caused by the vibration correction processing of correcting the display deviation caused by the attitude variation of the vehicle 200 (S204). The correction controller 52 calculates an initial position x1 of the display content Iv when the vibration correction amount is "0" based on the content display information output from the display processing device 30. The initial position x1 may change depending on the display reference position P0 and/or the feature portion of the display content Iv (see FIGS. 3A and 3B). Therefore, the initial position x1 is calculated based on the content display information (for example, the display reference position P0 and the content information). The correction controller 52 calculates the image correction error E1 based on the initial position x1, the deviation amount y, and the image correction value U of the display content Iv. The image correction error E1 is calculated by a difference between the first image correction value at the initial position x1 of the display content Iv and the second image correction value at the display position of the display content Iv after the vibration correction based on the deviation amount y.

Calculation of the image correction error E1 will be described. The image correction error E1 can be calculated in all the partitioned areas shown in FIGS. 7A and 7B, whereas the number of the vibration correction amounts C is one. Therefore, the number of the image correction errors E1 that can be added to the vibration correction is also one. Since the display content Iv is displayed across the plurality of partitioned areas, the correction accuracy of the display content Iv can be improved by selecting an image correction error at which partitioned area among the plurality of partitioned areas in which the display content Iv is positioned to be added to the vibration correction amount. In the present embodiment, the partitioned area to be used for the calculation of the image correction error E1 is selected based on the display position of the feature portion of the display content Iv, that is, the initial position x1. Accordingly, the accuracy of the display deviation correction of the feature portion of the display content Iv can be improved.

Figure 11A:
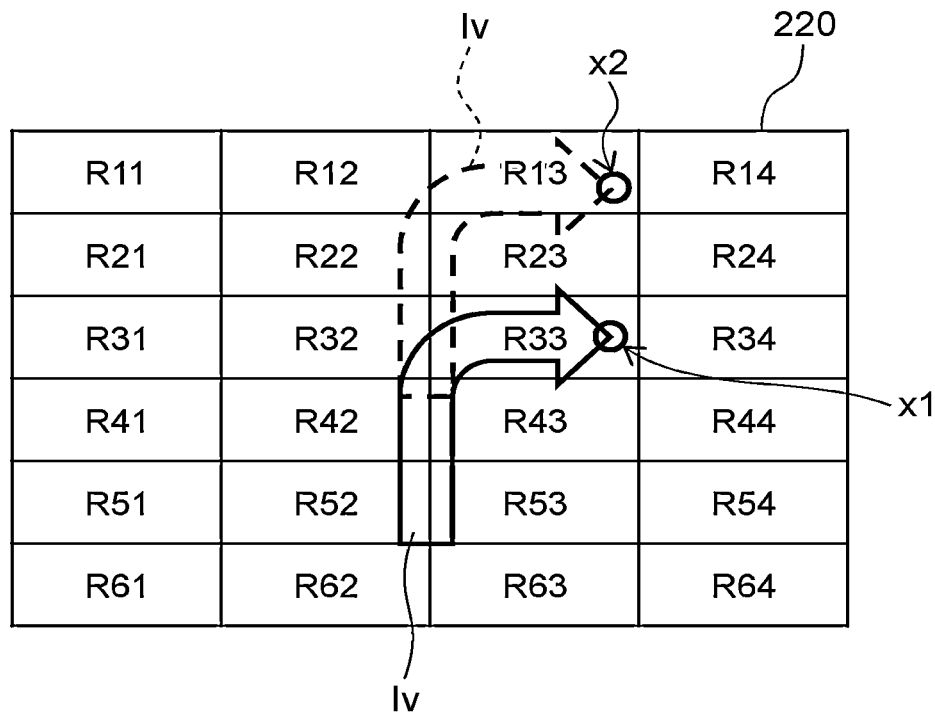
FIG. 11A is a diagram showing an example of a display position of display content before and after vibration correction in the display area.
Figure 11B:
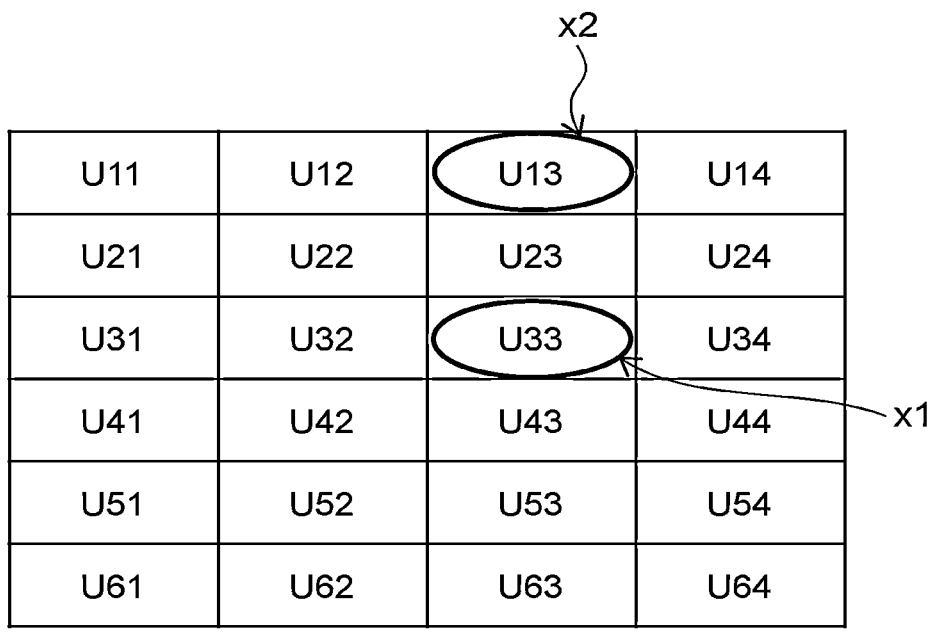
FIG. 11B is a diagram for illustrating a first image correction value before vibration correction and a second image correction value after vibration correction.

An example of calculation of the image correction error E1 will be described with reference to FIGS. 11A and 11B. FIG. 11A shows an example of a display position of display content Iv before and after vibration correction in the display area 220. FIG. 11B is a diagram illustrating the first image correction value before the vibration correction and the second image correction value after the vibration correction in the example in FIG. 11A. It should be noted that in FIG. 11A, the display content Iv represented by a solid line indicates the display position before the vibration correction, and the display content Iv represented by a dotted line indicates the display position after the vibration correction. FIG. 11B shows an image correction table including image correction values U11 to U64 respectively assigned to the plurality of partitioned areas R11 to R64 of the display area 220 shown in FIG. 11A.

In the example shown in FIG. 11A, before the vibration correction, that is, when the vibration correction amount is "0", the tip of the arrow being the feature portion of the display content Iv is positioned in the first partitioned area R33. Therefore, the initial position x1 of the display content Iv is the first partitioned area R33. After the vibration correction, the tip of the arrow being the feature portion of the display content Iv is positioned in the second partitioned area R13 above the first partitioned area R33. Therefore, the display position x2 of the feature portion of the display content Iv after the vibration correction is the second partitioned area R13.

Referring to FIG. 115, the first image correction value assigned to the first partitioned area R33 is "U33". In addition, the second image correction value assigned to the second partitioned area R13 is "U13".

Therefore, the image correction error E1 is calculated by subtracting the first image correction value U33 from the second image correction value U13.

In the present embodiment, the correction controller 52 has a first correction value table to which the first correction value Ea of the image correction corresponding to the deviation amount y from the initial position x1 is assigned. The correction controller 52 calculates the image correction error E1 based on the initial position x1, the deviation amount y, and the first correction value table. Specifically, the correction controller 52 acquires the correction value Ex as the first image correction value of the image correction at the initial position x1. For example, the correction value Ex is acquired from the image correction values U11 to U64 assigned to the plurality of partitioned areas R11 to R64 shown in FIGS. 7A and 7B. In addition, the correction controller 52 refers to the first correction value table and acquires the first correction value Ea as the second image correction value of the image correction at the display position x2 of the display content Iv after the vibration correction based on the deviation amount y from the initial position x1. The correction controller 52 calculates the image correction error E1 by subtracting the correction value Ex from the first correction value Ea.

FIG. 12 shows an example of the first correction value table including the first correction value Ea of the image correction assigned to the deviation amount y from the initial position x1 of the display content Iv. In the example shown in FIG. 12, the first correction value table including the first correction value Ea indicating the image correction value in the Z-axis direction corresponding to the angular deviation amount y about the Y-axis from the initial position x1 is shown. As shown in FIG. 12, in the first correction value table, the first correction value Ea is determined every time the angular deviation amount y changes by 0.01 [deg.]. For example, when the angular deviation amount y is $-0.01 \leq y < 0.00$, the first correction value Ea is E100, and when the angular deviation amount y is $-M/100 \leq y < -(M-1)/100$, the first correction value Ea is Em. In addition, when the angular deviation amount y is $0.00 \leq y < +0.01$, the first correction value Ea is E200, and when the angular deviation amount y is $+(N-1)/100 \leq y < +N/100$, the first correction value Ea is En. It should be noted that "M" and "N" mean any constants.

It should be noted that in the example shown in FIG. 12, an example in which the first correction value Ea is assigned every time the deviation amount y from the initial position x1 changes by 0.01 [deg.] has been described, but the present disclosure is not limited thereto. The range of the deviation amount y to which the first correction value Ea is assigned is not limited to every 0.01 [deg.]. In addition, in the example shown in FIG. 12, the first correction value Ea is assigned to the deviation amount y in the pitch axis direction from the initial position x1, but a correction value may be assigned to the deviation amount in the yaw axis direction and the roll direction from the initial position x1.

An example of calculation of the image correction error E1 using the first correction value table shown in FIG. 12 will be described. The correction value Ex (first image correction value) of the image correction at the initial position x1 of the display content Iv is calculated based on the initial position x1 and the image correction data 33g. For example, when initial position x1 is within the partitioned area R23 shown in FIG. 7A, the correction value Ex is determined as the image correction value U23. The first correction value Ea (second image correction value) of the image correction at the display position x2 of the display content Iv after the vibration correction based on the deviation amount y from the initial position x1 is calculated based on the initial position x1, the deviation amount y, and the first correction value table. For example, when the display position x2 of the display content Iv after the vibration correction is a position of −0.015 [deg.] around the Y-axis from the initial position x1, the image correction value E101 in the Z direction corresponding to the deviation amount "−0.02≤y<−0.01" is determined as the first correction value Ea with reference to the first correction value table shown in FIG. 12. In this case, the image correction error E1 is calculated by subtracting the image correction value U23 from the image correction value E101.

In the present embodiment, the correction controller 52 calculates the initial position x1, being the display position of the feature portion of the display content Iv when the vibration correction amount is "0" based on the content display information. For example, when the display content Iv is an arrow, the correction controller 52 calculates the display position of the tip of the arrow when the vibration correction amount is "0" as the initial position x1. The first correction value Ea is calculated based on a difference between the first image correction value (correction value Ex) at the first display position (initial position) of the feature portion of the display content Iv when the vibration correction amount is "0" and the second image correction value (first correction value Ea) at the second display position of the feature portion of the display content Iv after vibration correction. Accordingly, the display processing device 30 can control the display position of the feature portion of the display content Iv.

Returning to FIG. 10, the correction controller 52 calculates the vibration correction amount C based on the deviation amount y and the image correction error E1 (S205). For example, the correction controller 52 returns the pitch angle deviation amount y to the original value and determines such vibration correction amount C as eliminates the image correction error E1. Specifically, the correction controller 52 calculates the deviation correction amount by converting the deviation amount y being angle information into the number of pixels. The correction controller 52 adds the image correction error E1 to the deviation correction amount to determine such vibration correction amount C as returns the number of pixels corresponding to the deviation to the original value.

The correction controller 52 outputs the information on the vibration correction amount C to the display processing device 30 (S206).

The correction controller 52 determines whether to continue the correction processing (S207). For example, when the engine of the vehicle 200 is stopped, when a button for instructing termination of display of the display content Iv is operated, or the like, the correction controller 52 terminates the correction processing. If the correction processing is continued, the process returns to step S201.

As described above, in the present embodiment, the correction controller 52 calculates the vibration correction amount C of the display position of the display content Iv based on the attitude change amount and the image correction error E1 of the image correction caused by the vibration correction processing of correcting the display deviation caused by the attitude variation. Accordingly, positional deviation of the display position of the display content Iv can be suppressed.

8. Effects, Supplements, and the Like

The display system 100 of the present disclosure includes a display processing device 30, an image corrector 34, an attitude detection device 40, and a vibration correction processing device 50. The display processing device 30 controls display of the display content Iv. The image corrector 34 performs image correction involving a change in the display position of the display content Iv based on the image correction data 33g stored in advance. The attitude detection device 40 detects an attitude change amount of the vehicle 200 being a moving body. After the image correction is performed by the image corrector 34, the vibration correction processing device 50 calculates the vibration correction amount C of the display position of the display content Iv based on the attitude change amount of the moving body and the image correction error E1 of the image correction caused by the vibration correction processing of correcting the display deviation caused by the attitude variation of the moving body. The display processing device 30 controls the display position of the display content Iv based on the vibration correction amount C.

With this configuration, it is possible to suppress positional deviation of the display, position of the display content Iv with respect to the superimposition target. Specifically, in the display system 100 that performs the vibration correction processing after performing the image correction processing, it is possible to suppress the positional deviation of the display position of the display content Iv due to the image correction error E1 of the image correction caused by the vibration correction processing. Accordingly, it is possible to suppress a decrease in correction accuracy of the display position of the display content Iv.

The vibration correction processing device 50 calculates the deviation amount y of the display position of the display content Iv based on the attitude change amount of the moving body. The vibration correction processing device 50 calculates an initial position x1 of the display content Iv based on the content display information output from the display processing device 30. The vibration correction processing device 50 calculates the image correction error E1 based on the initial position x1, the deviation amount y, and the image correction value U (image correction data). The vibration correction processing device 50 calculates the vibration correction amount C based on the deviation amount y and the image correction error E1. Accordingly, it is possible to calculate the image correction error E1 from the deviation amount y, and calculate the image correction error E1 with higher accuracy. As a result, the positional deviation of the display position of the display content Iv can be further suppressed.

The vibration correction processing device 50 includes a first correction value table to which the first correction value Ea of the image correction corresponding to the deviation amount y from the initial position x1 is assigned, and calculates the image correction error E1 based on the initial position x1, the deviation amount y, and the first correction value table. Accordingly, the image correction error E1 can be easily calculated based on the deviation amount y from the initial position x1. As a result, the positional deviation of the display position of the display content Iv can be further suppressed.

The display processing device 30 controls the display position of the feature portion that determines the shape of the display content Iv at least. Accordingly, the display position of the feature portion of the display content Iv can be controlled with high accuracy.

The display area 220 in which the display content Iv is displayed has a plurality of partitioned areas R11 to R64. The image correction data 33g includes image correction values U11 to U64 respectively assigned to the plurality of partitioned areas R11 to R64. The image corrector 34 determines the image correction value U of the image correction based on the partitioned area in which the display content Iv is displayed and the image correction value assigned to the partitioned area. Accordingly, the image correction value U can be easily determined.

It should be noted that in the present embodiment, an example has been described in which the correction controller 52 includes the first correction value table indicating the first correction value Ea of the image correction corresponding to the deviation amount y from the initial position x1 of the display content Iv, but the present disclosure is not limited thereto. For example, the correction controller 52 does not need to have the first correction value table. In this case, the storage 53 may store the first correction value table. The correction controller 52 may read the first correction value table stored in the storage 53 to calculate the image correction error E1.

Second Embodiment

In the first embodiment, the correction controller 52 calculates the image correction error E1 using the first correction table to which the first correction value Ea of the image correction corresponding to the deviation amount y of the angle from the initial position x1 of the display content Iv is assigned. In the present embodiment, the correction controller 52 calculates the image correction error E1 using the second correction table to which the second correction value Eb of the image correction corresponding to the deviation correction amount G of the number of pixels from the initial position x1 of the display content Iv is assigned.

Figure 13:
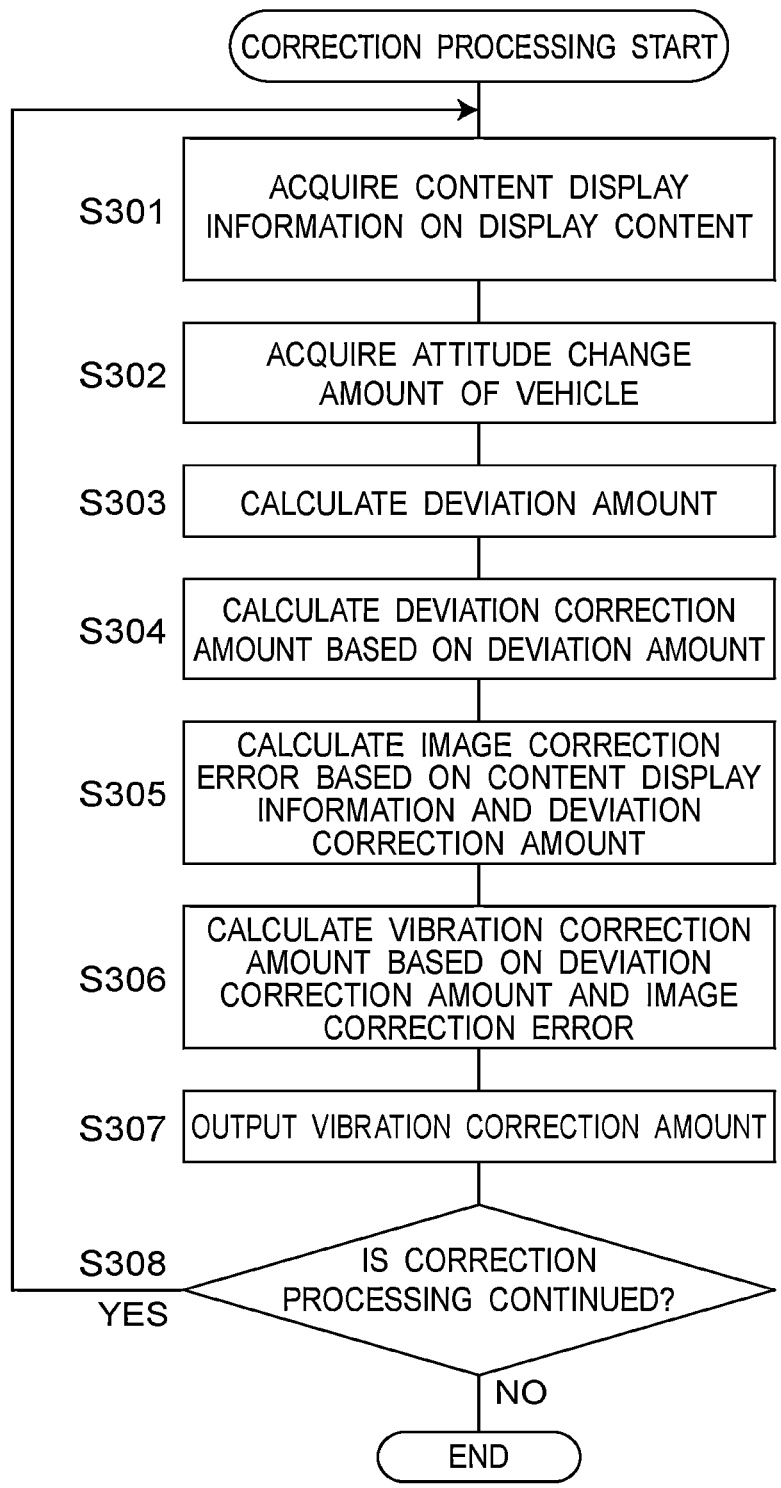
FIG. 13 is a flowchart showing correction processing in a second embodiment.

The operation of the correction controller 52 of the vibration correction processing device 50 according to the second embodiment will be described with reference to FIG. 13. FIG. 13 shows correction processing performed by the correction controller 52 of the vibration correction processing device 50 according to the second embodiment. Steps S301 to S303 and S307 to S308 in FIG. 13 are the same as steps S201 to S203 and S206 to S207 in FIG. 10 of the first embodiment.

The correction controller 52 acquires the content display information from the display processing device 30 (S301). The correction controller 52 acquires the attitude change amount indicating the angular velocity of the vehicle 200 output from the gyro sensor 41 (S302). The correction controller 52 calculates the attitude of the vehicle 200, that is, the deviation amount y with respect to the triaxial direction based on the attitude change amount (S303).

The correction controller 52 calculates the deviation correction amount G based on the deviation amount y calculated based on the attitude change amount (S304). The correction controller 52 converts the deviation amount y into the number of pixels, and determines such a deviation correction amount G as offsets the deviation amount indicated by the number of pixels.

The correction controller 52 calculates the image correction error E1 based on the content display information, the deviation correction amount G, and the image correction value U (S305). The correction controller 52 includes a second correction value table to which the second correction value Eb of the image correction corresponding to the deviation correction amount G from the initial position x1 of the display content Iv is assigned. For example, the second correction value table is stored in a storage included in the image correction error calculator 52c.

FIG. 14 shows an example of the second correction value table including the second correction value Eb of the image correction assigned to the deviation correction amount G from the initial position x1 of the display content Iv. In the example shown in FIG. 14, the second correction value table including the second correction value Eb indicating the image correction value in the Z-axis direction corresponding to the deviation correction amount G in the Z direction from the initial position x1 is shown. As shown in FIG. 14, in the second correction value table, the second correction value Eb is determined for each deviation correction amount G of 1 [pixel]. For example, when the deviation correction amount G is −1.0≤G<0.0, the second correction value Eb is E300, and when the deviation correction amount G is −J≤G<−(J−1), the second correction value Eb is Ej. In addition, when the deviation correction amount G is 0.0≤G<+1.0, the second correction value Eb is E400, and when the deviation correction amount G is +(K−1)≤G<+K, the second correction value Eb is Ek. It should be noted that "J" and "K" mean any constants.

It should be noted that in the example shown in FIG. 14, an example in which the second correction value Eb is assigned every time the deviation correction amount G from the initial position x1 changes by 1 [pixel] has been described, but the present disclosure is not limited thereto. The range of the deviation correction amount G to which the second correction value Eb is assigned is not limited to 1 [pixel]. In addition, in the example shown in FIG. 14, the second correction value Eb is assigned to the deviation correction amount G in the pitch axis direction, but the second correction value may be assigned to the deviation correction amount in the yaw axis direction and the roll direction.

The correction controller 52 calculates the image correction error E1 based on the initial position x1, the deviation correction amount G, and the second correction value table of the display content Iv. Specifically, the correction controller 52 acquires the correction value Ex (the first image correction value) of the image correction at the initial position x1. In addition, the correction controller 52 refers to the second correction value table and acquires the second correction value Eb (the second image correction value) of the image correction at the display position of the display content Iv after the vibration correction based on the deviation correction amount G from the initial position x1. The correction controller 52 calculates the image correction error E1 by subtracting the correction value Ex from the second correction value Eb.

An example of calculation of the image correction error E1 using the second correction value table shown in FIG. 14 will be described. The image correction error E1 is calculated by a difference between the correction value Ex (first image correction value) at the initial position x1 of the display content Iv and the second correction value Eb (second image correction value) at the display position x2 of the display content Iv after the vibration correction based on the deviation correction amount G from the initial position x1. The correction value Ex of the image correction at the initial position x1 of the display content Iv is calculated based on the initial position x1 and the image correction data 33g. For example, when initial position x1 is within the partitioned area R23 shown in FIG. 7A, the correction value Ex is determined as the image correction value U23 shown in FIG. 7B. The second correction value Eb of the image correction at the display position of the display content Iv after the vibration correction based on the deviation correction amount G is calculated based on the initial position x1, the deviation correction amount G, and the second correction value table. For example, when the display position of the display content Iv after the vibration correction based on the deviation correction amount G is a position of −0.8 [pixel] in the Z-axis direction from the initial position x1, the image correction value E300 in the Z direction corresponding to the deviation correction amount "−1.0≤G<0.0" is determined as the second correction value Eb with reference to the second correction value table shown in FIG. 14. In this case, the image correction error E1 is calculated by subtracting the image correction value U23 from the image correction value E300.

Returning to FIG. 13, the correction controller 52 calculates the vibration correction amount C based on the deviation correction amount G and the image correction error E1 (S306). The correction controller 52 calculates the vibration correction amount C by adding the image correction error E1 to the deviation correction amount G. Specifically, the correction controller 52 adds the image correction error E1 to the deviation correction amount G to determine such vibration correction amount C as returns the number of pixels corresponding to the deviation to the original value. For example, the correction controller 52 returns the pitch angle deviation correction amount G to the original value and determines such vibration correction amount C as eliminates the image correction error E1.

The correction controller 52 outputs the information on the vibration correction amount C to the display processing device 30 (S307).

The correction controller 52 determines whether to continue the correction processing (S308). For example, when the engine of the vehicle 200 is stopped, when a button for instructing termination of display of the display content Iv is operated, or the like, the correction controller 52 terminates the correction processing. If the correction processing is continued, the process returns to step S301.

As described above, in the present embodiment, the vibration correction processing device 50 calculates the deviation amount y of the display position of the display content Iv based on the attitude change amount of the moving body, and calculates the deviation correction amount G based on the deviation amount y. The vibration correction processing device 50 calculates an initial position x1 of the display content Iv based on the content display information output from the display processing device 30. The vibration correction processing device 50 calculates the image correction error E1 based on the initial position x1, the deviation correction amount G, and the image correction value U (image correction data). The vibration correction processing device 50 calculates the vibration correction amount C based on the initial position x1, the deviation correction amount G, and the image correction error E1. With this configuration, the image correction error E1 can be calculated based on the deviation correction amount G calculated from the deviation amount y, and the image correction error E1 can be calculated with higher accuracy. As a result, the positional deviation of the display position of the display content Iv can be suppressed.

In addition, the vibration correction processing device 50 includes a second correction value table to which the second correction value Eb of the image correction corresponding to the deviation correction amount G from the initial position x1 is assigned. The vibration correction processing device 50 calculates the image correction error E1 based on the initial position, the deviation correction amount G, and the second correction value table. Accordingly, the image correction error E1 can be easily calculated based on the deviation correction amount G. As a result, the positional deviation of the display position of the display content Iv can be further suppressed.

It should be noted that in the present embodiment, an example in which the vibration correction processing device 50 includes the second correction value table has been described, but the present disclosure is not limited thereto. For example, the vibration correction processing device 50 does not need to have the second correction value table. In this case, the vibration correction processing device 50 may calculate the image correction error E1 using the image correction data 33g stored in the storage 33 of the display processing device 30. That is, the vibration correction processing device 50 may receive the image correction data 33g from the display processing device 30 and calculate the image correction error E1 based on the image correction value included in the image correction data 33g. Accordingly, the number of components of the vibration correction processing device 50 can be reduced. It should be noted that when the vibration correction processing device 50 has the second correction value table, the number of communications between the communicator 31 and the communicator 51 can be reduced.

Other Embodiments

As described above, the above embodiments have been described as examples of the technique disclosed in the present application. However, the technique in the present disclosure is not limited to this, and can also be applied to embodiments in which changes, substitutions, additions, omissions, and the like are made as appropriate. Thus, in the following, other embodiments will be exemplified.

In the above embodiments, the case where each of the projection device 10, the information acquisition device 20, the display processing device 30, the attitude detection device 40, and the vibration correction processing device 50 is a separate device has been exemplified. However, a plurality of devices may be integrally formed as one device. For example, the display processing device 30 and the vibration correction processing device 50 may be integrally formed as one device. The information acquisition device 20 and the display processing device 30 may be integrally formed as one device. The attitude detection device 40 and the vibration correction processing device 50 may be integrally formed as one device. The separately formed devices are communicably connected to each other by wire or wirelessly. It should be noted that all of the projection device 10, the information acquisition device 20, the display processing device 30, the attitude detection device 40, and the vibration correction processing device 50 may be formed as one device. In this case, the communicators 31 and 51 do not need to be provided.

In the above embodiments, an example in which the information acquisition device 20 includes the GPS module 21 has been described. However, the information acquisition device 20 may include a distance sensor that measures a distance and a direction from the vehicle 200 to a surrounding target object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of a GPS module 21, a distance sensor, a camera, an image processing device, an acceleration sensor, a radar, a sound wave sensor, a white line detection device of an advanced driver-assistance systems (ADAS), and the like. In this case, the GPS module 21, the distance sensor, the camera, and the like having a function as the information acquisition device 20 may be built in one device, or may be individually attached to the vehicle 200.

In the above embodiments, an example in which the attitude detection device 40 includes the gyro sensor 41 has been described. However, the attitude detection device 40 may include an acceleration sensor that detects acceleration of the vehicle 200, and may output the detected acceleration as the attitude change amount. The attitude detection device 40 may include a vehicle height sensor that detects a height from the road surface, and may output the detected height as an attitude change amount. The attitude detection device 40 may include other known sensors. The attitude detection device 40 may include one or more of a gyro sensor 41, an acceleration sensor, a vehicle speed sensor, and the like. In this case, the gyro sensor 41, the acceleration sensor, the vehicle height sensor, and the like having a function as the attitude detection device 40 may be built in one device, or may be individually attached to the vehicle 200.

In the above embodiments, an example in which the image corrector 34 is included in the display processing device 30 has been described, but the present disclosure is not limited thereto. The image corrector 34 may be included in the vibration correction processing device 50.

In the above embodiments, the case where the moving body is the vehicle 200 such as an automobile has been described. However, the moving body is not limited to the vehicle 200. The moving body may be a vehicle that travels on the ground, and may be, for example, a train or a motorcycle. The moving body may be a drone capable of traveling by automated driving.

In the above embodiments, the case where the image is displayed in front of the moving body has been described. However, the position where the image is displayed is not limited to the front. For example, the image may be displayed in the side direction or the rear of the moving body.

In the above embodiments, an example in which the display system 100 is an HUD system has been described. However, the display system 100 does not need to be an HUD system. The display system 100 may include a liquid crystal display or an organic EL display instead of the projection device 10. The display system 100 may include a screen and a projector.

Outline of Embodiments (1) A display system of the present disclosure which controls a display of display content, includes: a processor; and a memory having stored thereon instructions executable by the processor. The instructions include: performing image correction involving a change in a display position of the display content based on image correction data stored in advance; detecting an attitude change amount of a moving body; calculating, after the image correction is performed, a vibration correction amount of the display position of the display content based on the attitude change amount of the moving body and an image correction error of the image correction caused by vibration correction processing of correcting a display deviation caused by an attitude variation of the moving body; and controlling the display position of the display content based on the vibration correction amount. Accordingly, positional deviation of the display position of the display content can be suppressed.

(2) In the display system according to (1), the calculating the vibration correction amount may include: calculating a deviation amount of a display position of the display content based on an attitude change amount of the moving body; calculating an initial position of the display content based on content display information output from the display processing device; calculating the image correction error based on the initial position, the deviation amount, and the image correction data; and calculating the vibration correction amount based on the deviation amount and the image correction error.

(3) In the display system according to (2), the memory may store a first correction value table to which a first correction value of the image correction corresponding to the deviation amount from the initial position is assigned, and the calculating the image correction error may include calculating the image correction error based on the initial position, the deviation amount, and the first correction value table.

(4) In the display system according to (2) or (3), the image correction error may be a difference between a correction value of the image correction at the initial position and a correction value of the image correction at a display position displayed when vibration correction is performed based on the deviation amount.

(5) In the display system according to (1), the calculating the vibration correction amount may include: calculating a deviation amount of a display position of the display content based on an attitude change amount of the moving body; calculating an initial position of the display content based on content display information output from the display processing device; calculating the deviation correction amount based on the initial position, the deviation amount, and the image correction data; calculating the image correction error based on the deviation correction amount; and calculating the vibration correction amount based on the deviation correction amount and the image correction error.

(6) In the display system according to (5), the memory may store a second correction value table to which a second correction value of the image correction corresponding to the deviation correction amount from the initial position is assigned, and the calculating the image correction error may include calculating the image correction error based on the initial position, the deviation correction amount, and the second correction value table.

(7) In the display system according to (5) or (6), the image correction error may be a difference between a correction value of the image correction at the initial position and a correction value of the image correction at a display position displayed when vibration correction is performed based on the deviation correction amount.

(8) In the display system according to any one of (1) to (7), the controlling the display position may include controlling a display position of a feature portion that determines a shape of the display content at least.
(9) In the display system according to any one of (1) to (8), a display area in which the display content is displayed may have a plurality of partitioned areas, the image correction data may include an image correction value assigned to each of the plurality of partitioned areas, and the performing image correction may include determining an image correction value of the image correction based on a partitioned area in which the display content is displayed and an image correction value assigned to the partitioned area.
(10) In the display system according to any one of (1) to (9), the performing image correction may include performing distortion correction of the display content. The image correction error may be a correction error due to the distortion correction.
(11) In the display system according to any one of (1) to (10), the instructions may include projecting light representing the display content may be further included.
(12) In the display system according to any one of (1) to (11), the moving body may be a vehicle. The display content may be content to be displayed in front of a windshield of a vehicle.

INDUSTRIAL APPLICABILITY

The present disclosure is applicable to a display system that controls a display position of display content according to movement of a moving body.

The invention claimed is:

1. A display system for controlling a display of display content, the display system comprising:
a processor; and
a memory having stored thereon instructions executable by the processor,
wherein the instructions include:
performing image correction involving a change in a display position of the display content based on image correction data stored in advance;
detecting an attitude change amount of a movable body;
calculating, after the image correction is performed, a vibration correction amount of the display position of the display content based on the attitude change amount of the movable body and an image correction error of the image correction caused by vibration correction processing of correcting a display deviation caused by an attitude variation of the movable body; and
controlling the display position of the display content based on the vibration correction amount,
wherein the image correction data includes an image correction value for correcting a deviation of the display position of the display content due to distortion or rotational deviation when the display content is displayed, and
wherein the image correction includes correcting the deviation of the display position of the display content due to the distortion or the rotational deviation by changing the display position of the display content based on the image correction value.

2. The display system according to claim 1,
wherein the calculating the vibration correction amount includes:
calculating a deviation amount of the display position of the display content based on the attitude change amount of the movable body;
calculating an initial position of the display content based on content display information output from a display processing device;
calculating the image correction error based on the initial position of the display content, the deviation amount, and the image correction data; and
calculating the vibration correction amount based on the deviation amount and the image correction error.

3. The display system according to claim 2,
wherein the memory is configured to store a first correction value table to which a first correction value of the image correction corresponding to the deviation amount from the initial position of the display content is assigned, and
wherein the calculating the image correction error is based on the initial position of the display content, the deviation amount, and the first correction value table.

4. The display system according to claim 2,
wherein the image correction error is a difference between a correction value of the image correction at the initial position of the display content and a correction value of the image correction at a display position of the display content displayed when vibration correction is performed based on the deviation amount.

5. The display system according to claim 1,
wherein the calculating the vibration correction amount includes:
calculating a deviation amount of a display position of the display content based on the attitude change amount of the movable body;
calculating a deviation correction amount based on the deviation amount;
calculating an initial position of the display content based on content display information output from a display processing device;
calculating the image correction error based on the initial position of the display content, the deviation correction amount, and the image correction data; and
calculating the vibration correction amount based on the deviation correction amount and the image correction error.

6. The display system according to claim 5,
wherein the memory is configured to store a second correction value table to which a second correction value of the image correction corresponding to the deviation correction amount from the initial position of the display content is assigned, and
wherein the calculating the image correction error is based on the initial position of the display content, the deviation correction amount, and the second correction value table.

7. The display system according to claim 5,
wherein the image correction error is a difference between a correction value of the image correction at the initial position of the display content and a correction value of the image correction at a display position of the display content displayed when vibration correction is performed based on the deviation correction amount.

8. The display system according to claim 1,
wherein the controlling the display position of the display content includes controlling a display position of a feature portion that determines at least a shape of the display content.

9. The display system according to claim 1,
wherein a display area in which the display content is displayed has a plurality of partitioned areas,
wherein the image correction value of the image correction data includes a plurality of image correction values assigned to each of the plurality of partitioned areas, and
wherein the performing the image correction includes:
identifying one of the plurality of partitioned areas in which the display content is displayed; and
performing the image correction based on one of the plurality of image correction values which is assigned to the one of the plurality of partitioned areas.

10. The display system according to claim 1,
wherein the performing the image correction includes performing distortion correction of the display content, and
wherein the image correction error is due to the distortion correction.

11. The display system according to claim 1,
wherein the instructions further include projecting light representing the display content.

12. The display system according to claim 1,
wherein the movable body is a vehicle, and
wherein the display content is to be displayed in front of a windshield of the vehicle.

13. The display system according to claim 3,
wherein the image correction error is a difference between a correction value of the image correction at the initial position of the display content and a correction value of the image correction at a display position of the display content displayed when vibration correction is performed based on the deviation amount.

14. The display system according to claim 13,
wherein the controlling the display position of the display content includes controlling a display position of a feature portion that determines at least a shape of the display content.

15. The display system according to claim 13,
wherein a display area in which the display content is displayed has a plurality of partitioned areas,
wherein the image correction value of the image correction data includes a plurality of image correction values assigned to each of the plurality of partitioned areas, and
wherein the performing the image correction includes:
identifying one of the plurality of partitioned areas in which the display content is displayed; and
performing the image correction based on one of the plurality of image correction values which is assigned to the one of the plurality of partitioned areas.

16. The display system according to claim 2,
wherein the controlling the display position of the display content includes controlling a display position of a feature portion that determines at least a shape of the display content.

17. The display system according to claim 2,
wherein a display area in which the display content is displayed has a plurality of partitioned areas,
wherein the image correction value of the image correction data includes a plurality of image correction values assigned to each of the plurality of partitioned areas, and
wherein the performing the image correction includes:
identifying one of the plurality of partitioned areas in which the display content is displayed; and
performing the image correction based on one of the plurality of image correction values which is assigned to the one of the plurality of partitioned areas.

18. The display system according to claim 2,
wherein the performing the image correction includes performing distortion correction of the display content, and
wherein the image correction error is due to the distortion correction.

19. The display system according to claim 2,
wherein the instructions further include projecting light representing the display content.

20. The display system according to claim 2,
wherein the movable body is a vehicle, and
wherein the display content is to be displayed in front of a windshield of the vehicle.

* * * * *